United States Patent [19]

Ban

[11] 4,047,084
[45] Sept. 6, 1977

[54] SEMICONDUCTOR MOTOR CONTROLLED FOR ENERGIZATION BY A SINGLE POSITION SENSING ELEMENT

[76] Inventor: Itsuki Ban, 829, Higashioizumi, Nerima, Tokyo, Japan

[21] Appl. No.: 547,507

[22] Filed: Feb. 6, 1975

[30] Foreign Application Priority Data

| Feb. 21, 1974 | Japan | 49-19959 |
|---|---|---|
| Feb. 27, 1974 | Japan | 49-22361 |
| Mar. 15, 1974 | Japan | 49-29229 |
| Mar. 15, 1974 | Japan | 49-29230 |
| Mar. 15, 1974 | Japan | 49-29231 |
| July 8, 1974 | Japan | 49-77439 |
| Aug. 20, 1974 | Japan | 49-94589 |

[51] Int. Cl.² .................................. H02K 29/00
[52] U.S. Cl. ................................ 318/254; 318/138
[58] Field of Search .......................... 318/138, 254

[56] References Cited

U.S. PATENT DOCUMENTS

| 3,023,348 | 2/1962 | Cox | 318/138 |
|---|---|---|---|
| 3,230,434 | 1/1966 | Bauerlein | 318/254 X |
| 3,577,053 | 5/1971 | McGee | 318/254 |
| 3,585,474 | 6/1971 | Kobayashi et al. | 318/138 X |
| 3,930,190 | 12/1975 | Liska | 318/254 |

*Primary Examiner*—Gene Rubinson
*Attorney, Agent, or Firm*—George B. Oujevolk

[57] ABSTRACT

A polyphase motor having a stator with an armature coil for each phase energized from a D. C. source by a semiconductor circuit. In addition to magnet means on the rotor which respond to the polarity caused by the D. C. current flowing across the armature coils, there is a rotating control band on the rotor with a written position indicator thereon. Disposed on the stator at a location where the written signals on the position indicator can be read are position sensing reading means. These reading means are coupled to the semiconductor stator circuit which in turn controls the flow of current from the D. C. source across the armature coils in accordance with the signals read on the control band.

13 Claims, 31 Drawing Figures

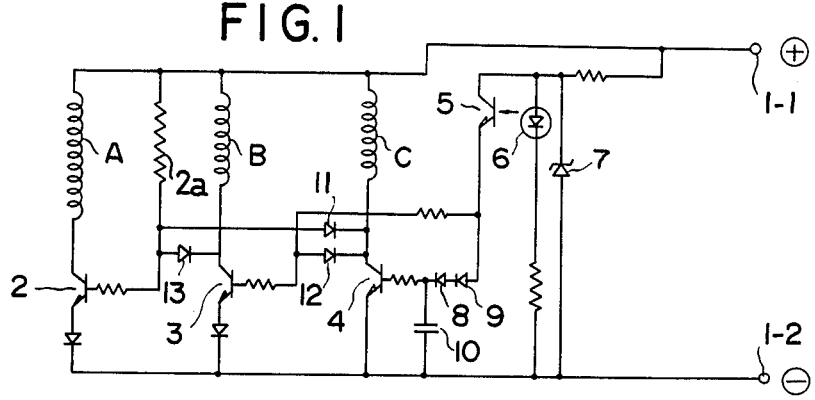
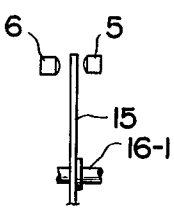
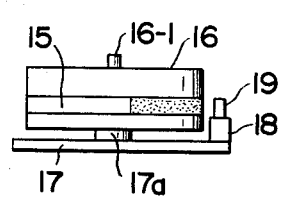
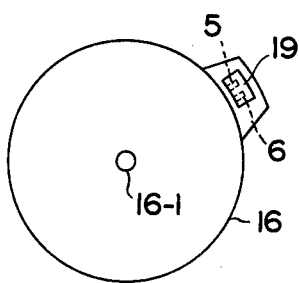
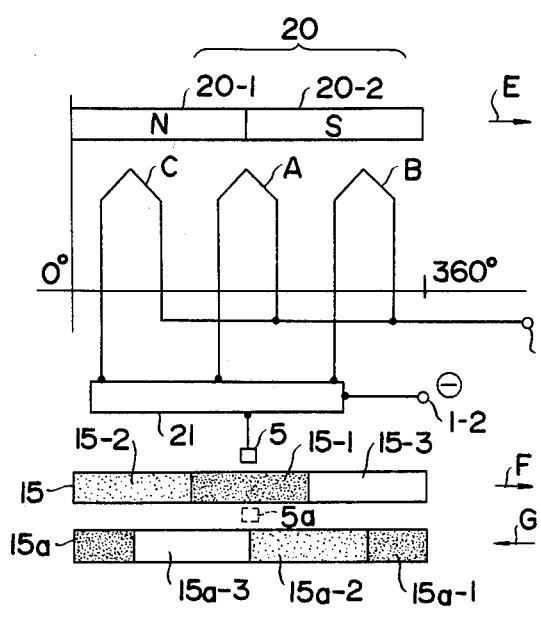
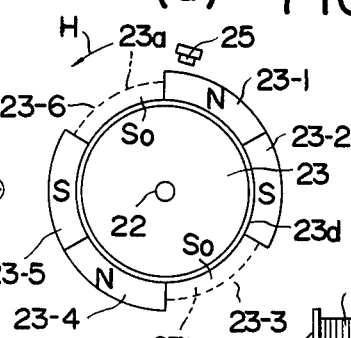
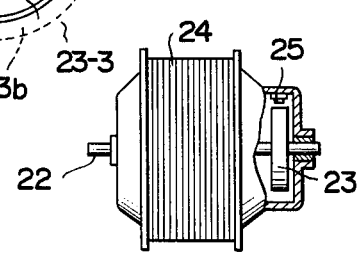

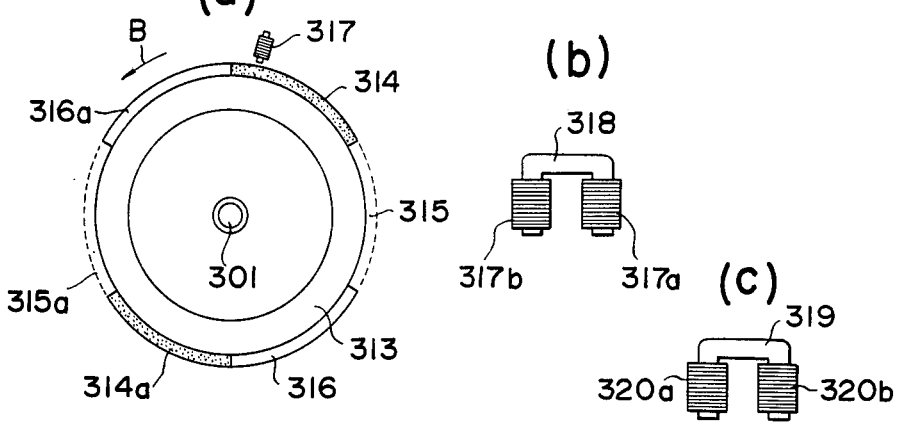
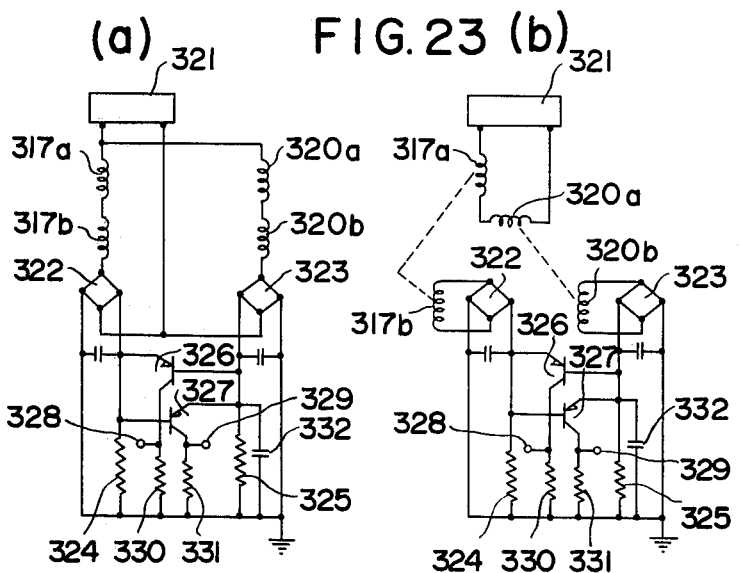
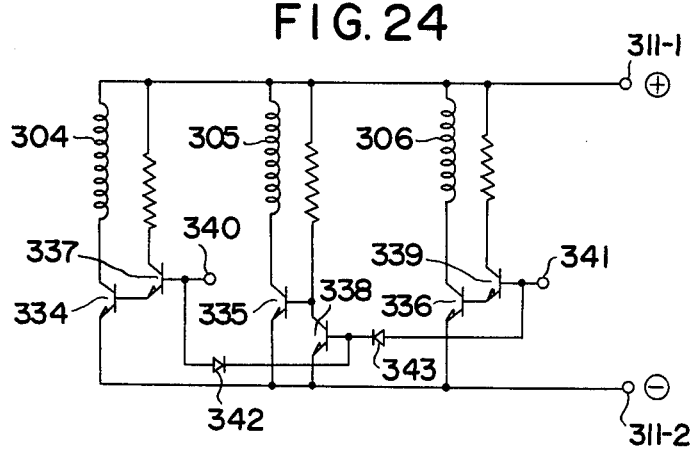

SEMICONDUCTOR MOTOR CONTROLLED FOR ENERGIZATION BY A SINGLE POSITION SENSING ELEMENT

BACKGROUND OF THE INVENTION

1. Field of the Invention

This invention relates to a semiconductor motor controlled for energization by a single position sensing element, or reading means, and more particularly, to a semiconductor motor for generating the continuous driving torque by conducting progressively and cyclically the semiconductor switching elements connected in series with the armature coils, through the position sensing signals obtained by a single position sensing element.

2. Prior Art

In general, in operating a motor from a D.C. source, it is conventional to generate the driving torque by effecting the conduction control of transistors connected in series with armature coils through sensing signals obtained by position sensing devices.

Therefore, when the armature coils are for a three phase machine, it is conventional to effect the respective conduction control of the three phase armature coils through three phase position sensing signals obtained by three sets of position sensing elements. In such a case, there are certain shortcomings, that is, since the amount of position sensing elements corresponding to the number of phase are necessary the system may become complex, and since the position sensing element is expensive the system as a whole may be costly. Also in such a conventional system, due to effecting the energization of the armature coil over the angle interval corresponding to the angle width of the magnetic pole, the counter electromotive force may become small at the place of the low magnetic field at both ends of the magnetic pole. Therefore, there will be an additional shortcoming, that is since at the end point an excessive armature current may flow and at that portion the magnetic field is low, the output torque may become small and the efficiency may deteriorate, and moreover the counter torque may mix to produce a revolution irregularity and vibration resulting in the further deteriorating of the efficiency. This shortcoming comes up as a problem particularly in the case of a high output power motor and may even result in not having any utility.

SUMMARY OF THE INVENTION

Generally speaking, the present invention contemplates a polyphase motor having a stator with an armature coil for each phase energized from a D. C. source by a semiconductor circuit. In addition to magnet means on the rotor which respond to the polarity caused by the D. C. current flowing across the armature coils, there is a rotating control band on the rotor with a written position indicator thereon. Disposed on the stator at a location where the written signals on the position indicator can be read are position sensing reading means. These reading means are coupled to the semiconductor stator circuit which in turn controls the flow or current from the D. C. source across the armature coils in accordance with the signals read on the control band. Basically, the semiconductor motor, having its rotor of a revolving-armature type or a revolving-field type, comprises armature coils of a plurality of phases mounted on the armature, a control band having a plurality of signal giving position indicator stages which are angularly spaced, e.g., each for substantially $2/n$ (wherein $n$ is 3 or 4) of the angular width of the field magnetic pole. The signal giving indicators are different from one another in physical characteristics, and can be sensed or read by a single sensitive element provided in faced relation to the control band. This position sensing element is coupled to the transistor power circuit and can enable various transistors in the power circuit, cyclically by reading or sensing different position sensing signals of a plurality of stages according to relative rotational position of the control band on the rotor. The semiconductor elements in the power circuit are arranged in an energization control circuit for progressively and cyclically energizing the armature coil of each phase corresponding to an individual stage of the control band by gating or conducting the semiconductor switching elements connected in series to the armature coils.

OBJECTS OF THE INVENTION

An object of this invention is to provide a semiconductor motor with means for generating a continuous driving torque by conducting progressively and cyclically semiconductor switching elements connected in series with armature coils through position sensing signals obtained by a single position sensing element to thereby contribute to the simplicity of the system and the inexpensive cost in manufacturing.

It is a further object of this invention to provide a semiconductor motor having a high efficiency wherein each armature coil is energized for substantially a phase angle of $2/n$ (wherein $n$ is 3 or 4) of the angle width of the field magnetic pole to thereby suppress the mixing of counter torque resulting in revolution irregularity as well as vibration.

It is another object of this invention to provide a semiconductor motor provided with means for suppressing the exertion of a temporary counter torque and zero torque which may be produced at starting and during running.

A further object of this invention is to provide a semiconductor motor provided with means for suppressing electric noise and mechanical sound and for flattening the resultant torque curve.

Further objects and advantages of the invention will be apparent from the following detailed description, reference being had to the accompanying drawings, in which:

BRIEF DESCRIPTION OF THE DRAWINGS

FIG. 1 is a circuit diagram of an energization control circuit for energizing a three-phase armature coil motor according to this invention;

FIG. 2 (*a*), (*b*), (*c*), (*d*), are explanatory views of a position sensing device employing a photoelectric element;

FIG. 3 is an expansion view of a field rotor and armature coils of the motor;

FIG. 4 (*a*), (*b*) is an explanatory view of a position sensing device employing a Hall device;

FIG. 22 (a), (b), (c) are explanatory views of a type of position sensing devices useful herein;

FIG. 23 (a), (b) shows another type of sensing device useful herein; and,

FIG. 24 is a circuit diagram of an energization control circuit.

DETAILED DESCRIPTION

THREE PHASE MOTOR

Figure 5:
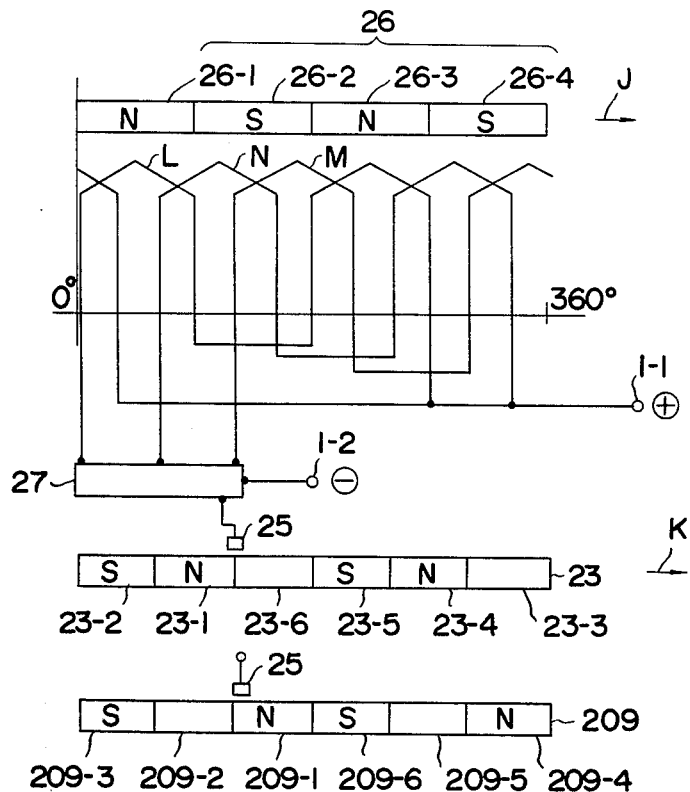
FIG. 5 is an expansion view of the field rotor and armature coils to be used in a mechanism of FIG. 4.

The polyphase motor contemplated herein will be described as a three phase motor, the armature coils A, B and C which will be enabled from a D. C. source from terminals 1-1, 1-2, being shown in FIG. 1. The current flow across armature coils A, B, C will be controlled by an optical control band 15 shown in FIGS. 2 (a), (b), (c), (d). FIG. 3 shows a block schematic explanation of a motor embodying this invention having a most simple construction that includes three-pole armatures of salient-pole type and three-phase armature coils. The rotor construction is illustrated in for example FIG. 2 (c).

Namely, on a support 17, a boss portion 17a is provided, on this boss portion. The armatures and windings having salient poles are shown in FIG. 1 and FIG. 3, i.e., on each of three salient-poles one of the three armature coils (shown as A, B and C in FIG. 1) is mounted respectively. Mounted for rotation within or outside of the armatures, there is a rotor 16 with a field comprising ferrite magnets in which the N and S poles are arranged 180° apart and are turned by a rotating shaft 16-1. This rotating shaft 16-1 is supported on a bearing provided to the boss portion 17a.

The magnets being a field rotor are fixed on the inside of the soft steel rotor 16. The field magnets 20 are also shown as reference numerals 20-1, 20-2 for N and S poles an expansion plan view of FIG. 3.

In FIG. 2(c) on the outside of the rotor 16 there is provided an optical control band 15 the reflection factor of which is different per each of the angular space of ⅔ of angular width of the field magnetic pole. Facing the optical control band 15 are a luminescent diode 6 and a photo transistor 5 juxtaposed in a housing 19 mounted on a stand 18. The inner portion of the housing 19 is shown in FIG. 2(d). The light from the luminescent diode 6 is projected onto the optical control band 15, and its reflected light is received by the photo transistor 5. The expansion plan view of the optical control band 15 is also shown in FIG. 3 with same reference numerals. Reference numeral 15-1 is a non-reflective face 15-3 is a reflective face and 15-2 is a face having a reflection factor intermediate between reflective factors of band portions 15-1 and 15-3. Therefore, the output of the photo transistor 5, as the optical control band 15 rotates in the direction F synchronously with the rotation of the field magnet 20 in the direction E, varies cyclically, that is zero output → intermediate value → maximum output. The optical band 15 can be made of plastic plate intended to form patterns different in transmission factor as shown in FIGS. 2(a) and 2(b).

Turning back to FIG. 3, one terminal of the armature coils A, B and C is in common connected to a positive terminal 1-1 of the power supply (not shown) while independent terminals are connected through the energization control circuit 21 to the power source negative terminal 1-2. The detail of the energization control circuit 21 is shown in FIG. 1. That is, one terminal of the armature coils A, B and C is in common connected to the positive terminal 1-1 of the power supply and other terminals are connected to collectors of the transistors 2, 3 and 4, respectively. Each emitter of the transistors 2 and 3 is connected through a diode to the negative terminal 1-2, while the emitter of the transistor 4 is connected direct to the terminal 1-2. The base of the transistor 2 is connected through its base resistor via a resistor 2a to the terminal 1-1. The base of the transistor 3 is connected through its base resistor via a further resistor to an emitter of the photo transistor 5, a collector of which is connected through its collector resistor to the terminal 1-1. The base of the transistor 4 is also connected through its base resistor via series diodes 8 and 9 to the emitter of the photo transistor 5. The anode of a diode 11 is connected between the base resistor of the transistor 2 and the resistor 2a while the cathode is connected to the collector of the transistor 4. The anode of a diode 13 is connected between the base resistor of the transistor 2 and the resistor 2a while the cathode is connected to the collector of the transistor 3.

The anode of a diode 12 is connected between the base resistor and the bias resistor of the transistor 3 while the cathode is connected to the collector of the transistor 4. One terminal of a condenser 10 is connected between the base resistor of the transistor 4 and one diode 8 while other terminal is connected to the negative terminal 1-2. Connected between the collector of the photo transistor 5 and the negative terminal 1-2 is a luminescent diode 6 with a Zener diode 7 parallel connected therewith.

In operation, by means of a Zener diode 7, the voltage to be impressed to the photo transistor 5 and the luminescent diode 6 has been stabilized. When the photo transistor 5 faces to the darker portion (non-reflection portion) 15-1, the transistor 2 is conducted by its base current obtained through a resistor 2a to thereby energize the armature coil A. Next, when, with the rotation of the motor, the photo transistor 5 faces to the semi-light-penetrating portion (intermediate reflection factor portion) 15-2, the transistor 3 is conducted by its base input obtained by the output of the photo transistor 5 to thereby energize the armature coil B. Thus, transistor 2 is nonconductive by the voltage drop of the base voltage of the transistor 2 through a diode 13 to thereby unenergize the armature coil A. When, with further rotation for 120° of the motor, the photo transistor 5 faces to the light-penetrating portion (reflection portion) 15-3, its output increases to exceed the voltage drops of the diodes 8 and 9 resulting in flowing the base current in the transistor 4 to be thus conductive to thereby energize the armature coil C. At this moment, the base voltages of the transistors 2 and 3 are dropped respectively through the diodes 11 and 12 to cause said transistors 2 and 3 to be nonconductive.

Figure 10:
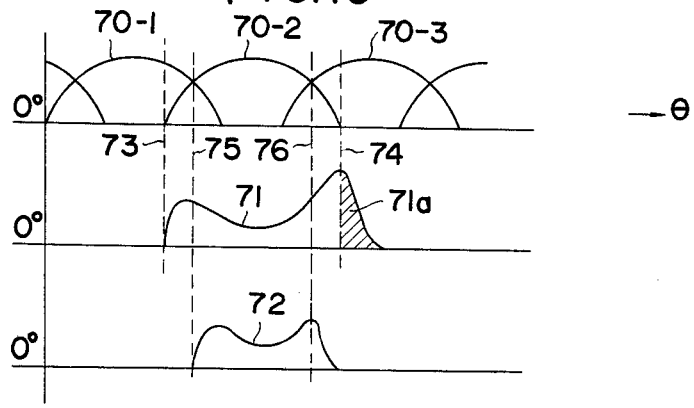
FIG. 10 is a graph of an energization curve.

As understood from the above explanation, with the rotation of the field magnet 2c, the armature coils A, B and C are, per each 120° of rotation, energized progressively and cyclically. FIG. 10 is a graph showing a situation of such energization. The abscissas axis is rotating angle of the field magnet 20. Curves 70-1, 70-2 and 70-3 are counter electromotive force curves of the armature coils A, B and C respectively.

According to the prior art, with regard to the armature coil B as an instance, the angular width to be energized is 180° identical with the angular width of the field magnet, i.e. interval between the dotted lines 73 and 74. Thus, the energization curve may be represented as in curve 71. The peak value at both ends may be caused due to small counter electromotive force. Since at this portion the torque is small, it results in only copper loss to thereby remarkably deteriorate the efficiency. Due to the inductance of the armature coils, the right hand peak is high, while the left hand peak value is low.

At the right hand peak value portion, since the inclined line portion 11a enters into the subsequent magnetic field to generate the counter torque, it contributes to the revolution irregularity and noise. Also, simultaneously it further deteriorates the efficiency.

On the contrary, according to this invention, it is characteristic that the energization width is restricted within the dot lines 75 and 76 so that the peak value disappears to thereby increase the efficiency and to cause the disappearance of the revolution irregularity as well as noise.

With respect to other armature coils A and B, the situation is entirely same, and three coils may therefore produce the output torque progressively to constitute a semiconductor motor revolving in one direction. It is also characteristic that the position sensing element 5 can be made from only a single element to construct the system inexpensively.

Though in the above noted embodiment the optical control band portion 15-1 is not-active, it is possible to make said portion 15-1 so as to produce a nonhindering signal, which in turn is discriminated by a discriminating circuit including the photo transistor 5, to conduct the transistor 2.

Turning back to FIG. 1, when starting, if the photo transistor 5 is incidentally located at the boundary between the optical control bands 15-1 and 15-3, an output of the same magnitude as that of the optical control band 15-2 may be produced to result in conducting the transistor 3 to thereby energize the armature coil B. This produces a counter torque, resulting in reversing rotation, and as the photo transistor 5 is turned to face to the optical control band 15-3 the motor runs in forward rotation.

The forward and reverse rotations are repeated. Accordingly, the starting torque may disappear to thereby cause an inconvenience.

Figure 18:
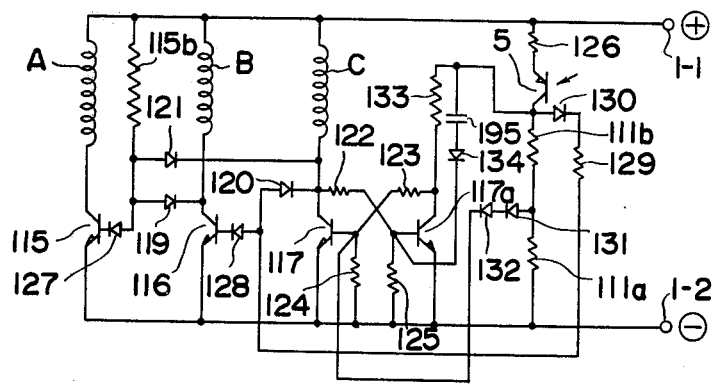
FIGS. 18 and 19 are circuit diagrams of other embodiments of the energization control circuit respectively.

Also, within running, the same phenomenon may occur, resulting in temporary mixing of the counter torque to cause an inconvenience. Means the prevention of such phenomenon is a condenser 10. As a result of the reversing rotation at starting, when the armature coil C is energized to invert the revolution to forward rotation, the condenser 10 is charged. Therefore, throughout the interval within which the photo transistor 5 reads signals from the optical control band 15-3 to 15-1, the energization of the transistor 4 is retained, by the preservation of the memory or storage in said condenser. Thus, this causes an effect that the starting is completely achieved without producing a counter torque. For the same reason, this causes an effect that it is possible to suppress the temporary counter torque which may be produced as the photo transistor 5 passes to face the optical control band 15-1 from 5-3. The condenser 10 functions as a storage or memory element, and the minimum capacity thereof for achieving the above mentioned purpose may be selected. The following is a description of another embodiment for such memory means. Referring to FIG. 18, in this energization control circuit, the memory means comprises a flip flop circuit in place of the condenser 10 used in the embodiment of FIG. 1. One terminal of armature coils A, B and C is connected in common to the positive terminal 1-1 of the power source supply (not shown) and other terminals of the coils A, B and C to collectors of the transistors 115, 116 and 117 respectively. All the emitters of these transistors 115, 116 and 117 are spliced to the terminal 1-2. There is also provided a photo transistor 5 (corresponding to the photo transistor shown in FIG. 1) with its emitter connected through an emitter resistor 126 to the positive terminal 1-1 and its collector connected through series resistors 111b and 111a to the negative terminal 1-2. The base of the transistor 115 is jointed via a diode 127 through a resistor 115b to the terminal 1-1. The base of the transistor 116 is joined via a diode 128 through a resistor 129 and a diode 130 to the collector of the photo transistor 5. Transistors 117, 117a, resistors 122, 123, 124, 125 form a flip flop circuit that is conventional in the art concerned. The bases of the transistors 117 and 117a are connected to the terminal 1-2 through resistors 124 and 125, respectively. The collector of the transistor 117 and the base of transistor 117a are jointed via resistor 122, and the collector of the transistor 117a and the base of the transistor 117 are jointed via resistor 123. The collector of the transistor 117a is connected via resistor 133 to the collector of the photo transistor 5. The base of the transistor 117a is also connected through a didoe 134 and a condenser 195 to said collector of the photo transistor. The base of the transistor 117 is connected through series diodes 131, 132 to a junction point between resistors 111a and 111b. There is provided a diode 119 with its anode connected to the anode of the diode 127 and its cathode connected to the collector of the transistor 116. There is provided a diode 120 with its anode connected to the anode of the diode 128 and its cathode connected to the collector of the transistor 117.

There is also provided a diode 121 with its anode connected to the anode of the diode 127 and its cathode connected to collector of the transistor 117.

In operation, when the photo transistor 5 is facing to the darker optical control band 15-1 (FIG. 2(a)), the transistor 115 is conducted through the resistor 115b to energize the armature coil A.

Next, upon 120° rotation of the motor when the photo transistor 5 is facing to the optical control band 15-2, the photoelectric current becomes an intermediate value whereby the transistor 116 is conducted to energize the armature coil B. At this time, the armature coil A is unenergized through the diode 119. Also at this time, a voltage is impressed to the flip flop circuit comprising the transistors 117 and 117a so that a reset pulse is applied through the condenser 195 to the base of the transistor 117a to thereby conduct the same.

Upon further 120° rotation of the motor, the photoelectric current becomes a maximum value so that since the base input is applied to the transistor 117 only by the voltage drop across the resistor 111a, the flip flop circuit is inverted to cause the transistor 117a non-conductive. Thus, the armature coil C is energized. The armature coils A and B are both unenergized through diodes 120 and 121. Accordingly, the armature coils to be energized with rotation of the motor are operated cyclically and alternately in a manner of A→B→C . . . to form a semiconductor motor. The situation of the energization is entirely identical with the preceding embodiment and therefore its functional effect is also identical therewith.

When starting, if the photo transistor 5 is incidentally located at the boundary between the optical control bands 15-1 and 15-3, since the photoelectric current becomes the intermediate value, the transistor 116 is conducted to energize the armature coil B, resulting in inversing rotation of the motor. However, immediately the photo transistor faces to the optical control band 15-3, resulting in the maximum value of photoelectric current. Thus, the transistor 117 is conducted to energize the armature coil C so that the motor is changed to forward rotation, resulting in that the photo transistor is again located at the boundary between the optical control bands 15-1 and 15-3. However, since the transistor 116 is held non-conductive through the diode 120, the armature coil B is not energized.

Therefore, it is prevented from producing a counter torque. Upon further rotation, when the photo transistor 5 faces to the optical control band 15-1, since the photoelectric current disappears the impressed voltage for the flip flop circuit also disappears to thereby cause both the transistors 117 and 117a non-conductive. Therefore, the armature coil A is energized while the armature coil C is unenergized. Thus it is characterized that the motor starts completely.

The following is a description concerning a case wherein the motor power is large and the motor can revolve in reversing rotation in the first mentioned embodiment. As shown in FIG. 3, in addition to the optical control bband 15, an optical control band 15a is juxtaposed. The optical control bands 15 and 15a are arranged so as to shift the angular phase with respect to each other for the magnetic pole width (180°) of the field magnet. The reference numeral 15a-1 is a darker portion, 15a-2 a semi-light-penetrating portion and 15a-3 light-penetrating portion.

When shifting the photo transistor 5 by using a lever mechanism or a knob into a position 5a facing to the optical control band 15a, the armature coil to be energized may be B or C and come under the magnetic field of the field pole of the opposite polarity, thus revolving in reversing rotation so that the optical control band 15a rotates in a direction G. In such case, the circuit construction shown in FIG. 7 that has somewhat modified the energization control circuit 21 according to the output will be hereinafter described.

Figure 7:
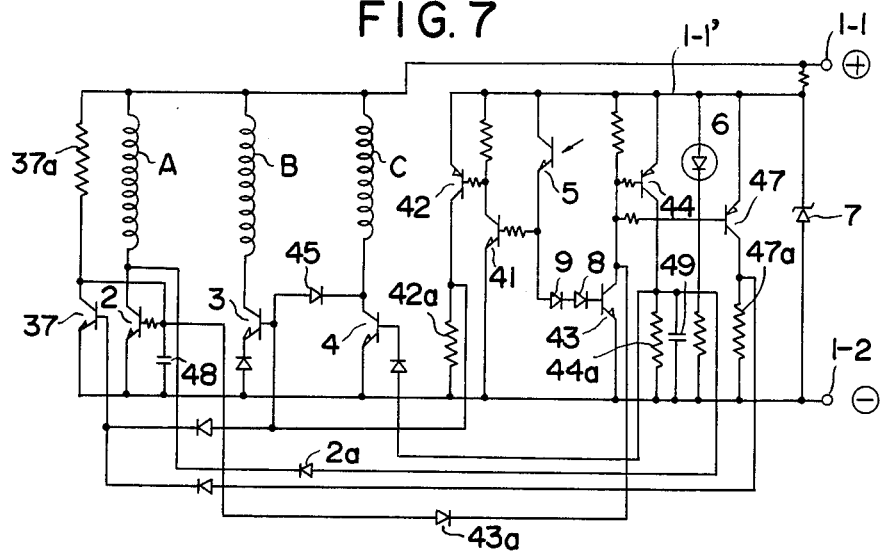

In FIG. 7 those parts which are the same as in FIG. 1 have the same reference number.

Armature coils A, B and C are each connected between the negative terminal 1-1 and the collectors of the transistors 2, 3 and 4, respectively. The emitters of the transistors 2 and 4 are connected to the negative terminal 1-2 and the emitter of the transistor 3 connected through the diode to the terminal 1-2. The base of the transistor 3 is connected through a diode 45 to the collector of the transistor 4. There is provided a transistor 37 with its collector connected through a resistor 37a to the terminal 1-1 and emitter connected to the terminal 1-2. The collector of the transistor 37 is direct connected to the base of the transistor 2 via its base resistor and is joined through a condenser 48 to the terminal 1-2. There is also provided a transistor 42 with its emitter connected to a branch line 1-1' joined through a steady resistor to said terminal 1-1 and with collector connected to the negative terminal 1-2 via resistor 42a. There is arranged another transistor 41 with its collector connected through a resistor to the terminal 1-1' and to the base of the transistor 42 via its base resistor and emitter connected direct to the terminal 1-2. For sensing positions of the motor, there is provided a photo transistor 5 with its collector connected direct to terminal 1-1' and its emitter connected to the base of the transistor 41 via base resistor thereof and to the base of a transistor 43 through series diodes 8 and 9. The transistor 43 has a collector connected through a resistor to the terminal 1-1' and to the base of the transistor 44 through its base resistor as well as an emitter connected direct to the opposite terminal 1-2. The transistor 44 has an emitter connected direct to the branch line 1-1' and a collector joined through parallel connected resistor 44a and condenser 49 to the terminal 1-2. A luminescent diode 6 cooperating with the photo transistor 5 and a resistor are connected between the branch line 1-1' and terminal 1-2. The collector of the transistor 43 is also connected to the base of a transistor 47 through its base resistor, having an emitter connected direct to the branch line 1-1' and a collector connected through a resistor 47a to the terminal 1-2. The collector of the transistor 42 is connected to the base of the transistor 3 and to the base of the transistor 37 via a diode. The collector of the transistor 44 is connected to the base of the transistor 4 via a diode and to the collector of the transistor 2 via a diode 2a. The collector of the transistor 43 is connected to the collector of the transistor 37 via a diode 43a. Also collector of the transistor 47 is connected to the base of the transistor 37 via a diode.

In operation, if the photo transistor 5 faces to the light-penetrating portion 15a-3 as shown in FIG. 3, its output becomes maximum thereby to conduct the transistor 43 via diodes 9 and 8 and thus to conduct the transistor 44. Therefore, the transistor 4 is conducted through the transistor 44 to energize the armature coil C. The base voltage of the transistor 3 is dropped through the diode 45 and since the transistor 47 is also conducted the base voltage of the transistor 37 is elevated through the resistor 47a so as to conduct the same. Hence, the transistor 37 is conducted to retain the transistor 2 non-conductive. Therefore, both the armature coils A and B are unenergized. Accordingly, since the field magnet 20 as shown in FIG. 3 revolves in a direction opposite to the arrow E and suddenly to face to the portion 15a, -2, the output of the photo transistor 5 becomes small. Hence, the transistor 43 becomes non-conductive and only the transistors 41 and 42 are conducted. Accordingly, the base voltage of the transistor 3 is elevated through the resistor 42a so as to conduct the same while the transistor 4 becomes non-conductive. Further since the base voltage of the transistor 37 is elevated through the resistor 42a, the same is conducted to retain the transistor 2 non-conductive. Thus, only the armature coil B is energized. When, upon rotating the motor for 120°, the photo transistor 5 faces to the portion 15a-1, the output of the photo transistor 5 disappears so that the transistors 3 and 4 become non-conductive. The control input of the transistor 37 through the resister 42a disappears and the control input of the transistor 37 through the resistor 47a disappears so that the transistor 37 becomes non-conductive.

Accordingly, the base input of the transistor 2 is obtained through the resistor 37a thereby to conduct the same so that the armature coil A is energized. In this way, per each 120° in the motor rotation the armature coil is energized cyclically in a fashion C→B→A . . . to cause the motor to revolve in reversing rotation. The energization curve in this case is entirely the same as one in FIG. 10 explained with respect to the preceding embodiment. Thus, the function and effect thereof are also the same.

When starting if the photo transistor 5 is incidentally located at the boundary between portions 15a-1 and 15a-3, its output may be same magnitude as seen by that of the portion 15a-2, resulting in energization of the armature coil B to revolve the motor in reversing rotation. However, the photo transistor 5 immediately faces to the portion 15a-1, resulting in converting the motor to revolve in forward rotation. However, it may be again converted to reversing rotation to cause an inconvenience.

Also, within running of the motor, the armature coil B may be temporarily energized to produce a counter torque thus to cause an inconvenience. There is provided a condenser 48 for prevention of such inconvenience. When starting if the photo transistor 5 is positioned at the boundary between portions 15a-1 and 15a-3, the armature coil B is energized, resulting in reversing rotation, so that the photo transistor faces to the portion 15a-1 thus to conduct the transistor 2. Therefore the condenser 48 is charged in accordance with the converting in forward rotation so that the conduction of the transistor 2 is retained.

Hence after passing said boundary the photo transistor 5 faces to portion 15a-3. At the moment, due to the conducting of the transistor 43 the condenser 48 is discharged through the diode 43a resulting in disappearing of the storage or memory so that the transistor 2 becomes non-conductive and also the armature coil A is unenergized to cause a continued rotation. Within the running, at the boundary between portions 15a-1 and 15a-3, there is not produced a temporary energization of the armature coil B so that it is possible to avoid said inconvenience. The condenser 49 is a storage or memory element for preventing the mixing of the temporary counter torque, as described in connection with FIG. 1, in case of the rotative direction (i.e. direction of arrow E) wherein the photo transistor 5 faces to the optical control band 15 as in FIG. 3. This embodiment is different from the other embodiment in that it is so arranged that the storaged voltge of the condenser 49 is discharged and disappears through the diode 2a in accordance with the energization of the armature coil A. By such means, since it is possible to have kept a time-constant of the condensers 48 and 49 relatively long, this can provide an effective technical means either in case of gradually starting with heavy loads at starting or in case of a motor changing from low speed to high speed. The preceding embodiments employ a photoelectric element as the position sensing element, and the following is a description concerning a case using a Hall device.

FIG. 4 (b) shows a whole of a so-called inner-revolution type motor 24 that has a rotative shaft 22 to which a rotor 23 is fixed, which rotor is constructed as shown in FIg. 4(a). That is, magnetic poles (ferrite magnets) 23-1, 23-2 . . . are fixed on a soft steel plate 23-d, the angular space of which poles is each 2/3 (60°) of the angular width (90°) of the field magnetic poles. The portions 23-3 and 23-6 lack the magnet to form non-signal portions. However, the purpose is also achieved by providing the low height magnet so poles (having weaker magnet intensity than S pole) to form signal existing portions, as shown in dot lines 23a and 23b.

The Hall device 25 is fixed to the motor body (FIG. 4(b)) so as to face to the magnetic pole group 23-1, 23-2, . . .

FIG. 5 is an expansion plan view illustrating the magnetic poles (each spaced for 90°) 26-1, 26-2, . . . of the field magnets 26 of the above mentioned motor as well as three phase armature coils L, M and N. Reference numeral 23 designates an expansion of the rotor in FIG. 4 and the portions 23-6 and 23-3 lack the magnetic poles. The detail of an energization control circuit 27 is shown in FIG. 6.

One terminal of the armature coils L, M, and N is each connected in common to the positive terminal 1-1 of the power suppoly and other terminals connected to the collector of the transistors 28, 29 and 30, respectively. All of emitters of the transistors are connected direct to the negative terminal 1-2. There is provided a transistor 37 with a collector connected through a resistor to the terminal 1-1 and to the base of the transistor 28 and an emitter connected direct to the terminal 1-2.

There is also a Hall device 25 having two couples of terminals as well known. Each of one couple of terminals is connected via a resistor to the terminals 1-1 and 1-2 respectively and each of other couple of terminals connected to the base of transistors 31 and 32, respectively. The transistor 31 has its emitter connected direct to the terminal 1-1 and a collector joined through parallel-connected resistor 31a and condenser 35 to the terminal 1-2. Also the transistor 32 has an emitter connected to the terminal 1-1 and a collector connected via a resistor 32a to the terminal 1-2. The collector of the transistor 29 is connected via a diode 36 to the collector of the transistor 31. The collector of the transistor 31 is connected to the base of the transistor 30 via its base resistor and to the base of the transistor 37 via a diode 33. The collector of the transistor 32 is connected to the base of the transistor 29 through a diode and to the base of the transistor 37 through a diode 34.

Figure 6:
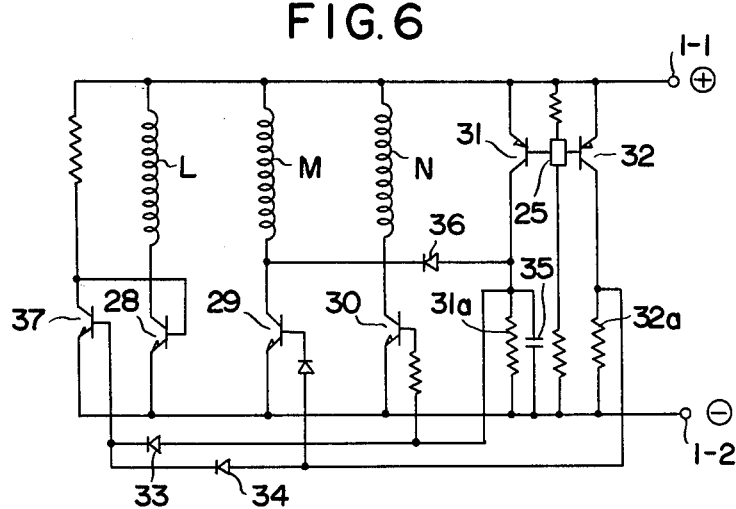
FIG. 6, 7, 8 and 9 are circuit diagrams of other embodiments of the energization control circuit respectively.

In operation, referring to FIG. 6 when the Hall device faces the N pole of the magnetic pole portion 23-1, an output is obtained from the left side of the Hall device 25 to conduct the transistor 31 thereby to conduct the transistor 30 through the resistor 31a so that the armature coil N is energized to produce a driving torque. When the Hall device 25 faces the S pole (portion 23-2) upon the motor rotation, an output is obtained from the right side of the device to conduct the transistor 32 so that the transistor 29 is conducted to energize the armature coil M. Since the voltage drops of the resistors 31a and 32a cause the transistor 37 to conduct the same through the diodes 33 and 34, the transistor 28 is held non-conductive. Upon the further 60° rotation of the motor, the Hall device 25 faces the clear or gap portion 23-3 so that the output therefrom disappears. Therefore since the voltage drops of the resistors 31a and 32a disappear to cause the transistors 29 and 30 to be non-conductive, the armature coils N and M are unenergized. Simultaneously the transistor 37 becomes non-conductive, so that the transistor 28 is conducted to energize the armature coil L. Then the motor rotates for 60° so that the Hall device 25 faces to the portion 23-4 to cause the armature coil N to be energized.

In this way, the invention provides a semiconductor motor revolving in a manner that per each 60° rotation of the motor the energization of the armature coils is cyclically alternately operated in a fashion N → M → L . . .

In the above-explained rotation, the Hall device 25 which is the position sensing element is only one single unit, and since the energization curve is entirely the same with the graph of FIG. 10, the function and effect are the same as with the preceding embodiment.

When starting, if the Hall device is incidentally located at the boundary between the magnetic pole portions 23-1 and 23-2, since the magnetic field becomes zero the transistor 28 is conducted to cause the armature coil L to be energized to produce a counter torque. By this reversing rotation, when the Hall device faces to the N pole portion 23-1 it changes to the forward rotation. However, immediately it again changes to the reversing rotation to exhibit an inconvenience. Also when running, at passing the boundary between portions 23-1 and 23-2 the armature coil L is temporarily energized resulting in producing the counter torque to cause an inconvenience.

The condenser 35 is intended to exclude such inconvenience. As above-noted by reversing rotation when the Hall device 25 faces to the N pole portion 23-1, the armature coil N is energized with the condenser 35 charged to hold a conduction of the transistor 30. Therefore after passing the boundary between the portions 23-1 and 23-2, the transistor 30 first becomes non-conductive, and since at this time the Hall device already has faced to the portion 23-2 (S pole) the armature coil M is energized so that the continued rotation is caused. Also within running the condenser 35 is holding the conduction of the transistor 30 through a time interval corresponding to the time constant. Therefore, it prevents the temporary energization of the armature coil L so that the aforesaid inconvenience is exluded. It is desirable to erase the memory of the condenser 35 when the armature coil M is energized. To this end, it is so arranged that by providing the diode 36 the electric charges of the condenser 35 is, with the conduction of the transistor 29, discharged through the diode 36.

As apparent from the above description, the object of this invention is also achieved by this embodiment. Even through the diode 36 is excluded, the object is achieved by suitably setting the time constant of the condenser 35.

Figure 8:
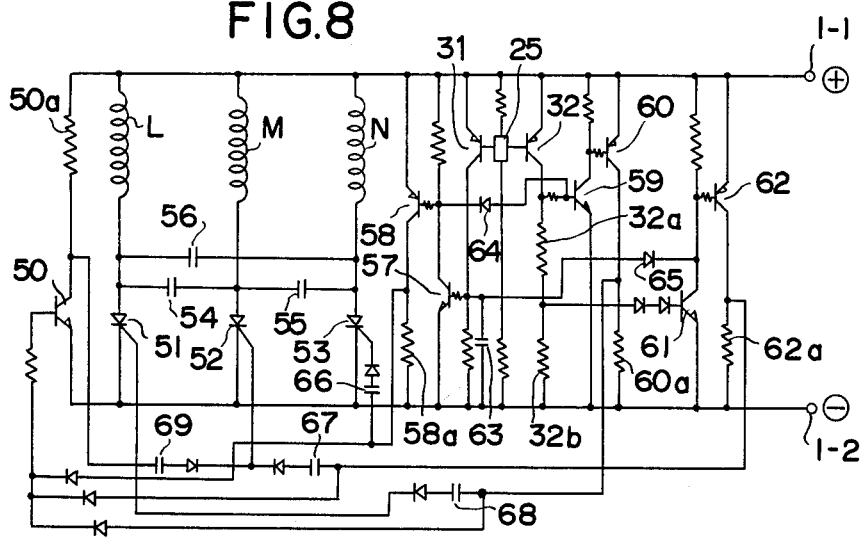

Next, shown in FIG. 8 is an energization control circuit having a So pole in both gap portions 23-3 and 23-6. As the switching element the silicon control recitifier (SCR) is used in place of the transistor.

Armature coils L, M and N of the motor are energized through the SCRs 51, 52 and 53 respectively from the power supply terminals 1-1 and 1-2. A condenser 54 is jointed between anodes of the transistors 51 and 52, a condenser 55 between anodes of the transistors 52 and 53 and a condenser 56 between anodes of the transistors 51 and 53.

There is provided a transistor 50 having a collector connected through a resistor 50a to the positive terminal 1-1 and an emitter direct joint to the negative terminal 1-2.

There is provided a transistor 58 with its emitter connected to the terminal 1-1 and its collector connected via a resistor 58a to the opposite terminal 1-2. There is also provided a transistor 57 having a collector connected to the terminal 1-1 via a resistor and to the base of the transistor 58 via its base resistor and an emitter direct connected to the terminal 1-2.

As well known, a Hall device 25 has two couples of terminals. One couple of terminals are connected to the terminals 1-1 and 1-2 through resistors respectively and other couple to the bases of transistors 31 and 32 respectively. The transistor 31 has its emitter connected to the terminal 1-1 and its collector connected to the terminal 1-2 via parallel resistor and condenser 63 and to the base of the transistor 57 via its base resistor. The transistor 32 has an emitter connected to the terminal 1-1 and a collector connected via series resistors 32a and 32b to the terminal 1-2.

There is provided a transistor 59 with a base connected to the collector of the transistor 32 through a base resistor and to the collector of the transistor 57 via a diode 64.

The transistor 59 has its collector connected through a resistor to the terminal 1-1 and to the base of the transistor 60 via its base resistor and its emitter connected direct to the terminal 1-2.

The transistor 60 has an emitter connected direct to the terminal 1-1 and a collector connected to the terminal via a resistor 60a.

Also there is provided a transistor 61 which has a base connected through two series diodes to a point between resistors 32a and 32b.

The transistor 61 has a collector connected to the collector of the transistor 31 via a diode 65 and to the terminal 1-1 via a resistor and an emitter jointed to the opposite terminal 1-2.

There is provided a further transistor 62 with a base connected to the collector of the transistor 61, an emitter connected to the terminal 1-1 and a collector jointed to the terminal 1-2 via a resistor 62a.

The collector of the transistor 58 is connected to a gate electrode of the SCR 53 via series diode and condenser 66 and to the base resistor of the transistor 50 via a diode.

Also the collector of the transistor 62 is connected to a gate electrode of the SCR 52 via series diode and condenser 67 and to said base resistor via a diode. The collector of the transistor 60 is connected to a gate electrode of the SCR 51 via series diode and condenser 68 and to said base resistor via a diode. Finally the collector of the transistor 50 is joined to the gate electrode of the SCR 52 through series condenser 69 and diode.

In operation, referring to FIG. 8, when the Hall device 25 faces to the N pole, the transistors 57 and 58 are conducted so that a differential pulse through the resistor 58a and condenser 66 ignites the SCR 53 to cause the armature coil N to be energized. Simultaneously the transistor 50 is conducted by the voltage drop across the resistor 58a.

Hence a driving torque is generated so that the motor is rotated and in turn the Hall device 25 faces to the S pole. Thus the output is obtained from the right hand side of the Hall device as shown and the transistors 61 and 62 is conducted via the resistor 32b so that the differential pulse through the resistor 62a and the condenser 67 ignites the SCR 52 to cause the armature coil M to be energized. Also simultaneously, the transistor 50 is conducted through the diode. Further the SCR 53 is extinguished so that the armature coil N is unenergized.

Upon further rotation of 60° of the motor, since the Hall device 25 faces to the So pole 23-3 (as shown in FIG. 4(a)), the Hall current is decreased so that the transistors 61 and 62 become non-conductive and the transistors 59 and 60 become conductive due to the voltage drop across the resistors 32a and 32b. Thus the differential pulse via the resistor 60a and condenser 68 is entered into the SCR 51 to ignite the same so that the armature coil L is energized. Therefore the SCR 52 is extinguished via the current-change condenser 54 to cause the armature coil to be unenergized.

Upon still further rotation of 60° of the motor, since the Hall device again faces to the N pole 23-4, the SCR 53 is ignited so that the armature coil N is energized and therewith the SCR 51 is extinguished via the current-change condenser 56. In this way, the armature coils are cyclically energized in a manner of N→ M→ L . . . to constitute a semi-conductor motor producing a continued driving torque. The Hall device 25 is of course only single and other effects are entirely same as FIG. 6. That is, the energization curve is the same as the graph shown in FIG. 10.

Specifically, the curves 70-1, 70-2 and 70-3 depend upon the armature coils N, M and L respectively and saying for example as to the armature coil M its energization curve becomes a width of 60° shown in curve 72. In accordance with the prior conventional art, the energization width is between dot lines 73 and 74 corresponding to the field pole width, with its energization curve being shown in curve 71.

Thus at peak value of both ends and at the inclined line portion 71a of the right, the counter torque is produced to thereby deteriorate the efficiency and to produce the revolution irregularity. However, according to the embodiment of this invention, it is characterized in that such shortcoming is removed.

When starting, if the Hall device 25 has incidentally faced to the boundary between the N pole 23-1 and the S pole 23-2, its output is zero.

Thus none of any SCR may be ignited and can start. The transistor 50 is provided for preventing this inconvenience.

When the Hall output is zero, since the voltage drop across the resistors 62a, 60a and 58a is also zero, the transistor 50 becomes non-conductive and the differential pulse via the resistor 50a and condenser 69 is entered into the gate of the SCR 52 to ignite the same so that the armature coil M is energized. Therefore the starting is completely achieved.

Next, when starting if the Hall device has incidentally faced to a point of the magnetic strength substantially equal with the So pole 23-3, middle between the N pole 23-1 and the S pole 23-2 but close to such S pole, the SCR 51 is ignited resulting in reversing rotation, and immediately the Hall device faces to the N pole 23-1 to ignite SCR 53 resulting in forward rotation. However it again changes to the reversing rotation to cause an unstable starting.

The condenser 63 is provided for preventing such inconvenience. In the above-noted case, simultaneously with changing to the forward rotation when the Hall device 25 faces to the N pole 23-1, the condenser 63 is charged to hold the conduction of the transistor 57. Thus since it is causing the base voltage of the transistor 59 to drop through the diode 64, the differential pulse via the resistor 60a and condenser 68 can be suppressed until the Hall device 25 completely passes the boundary between the N pole 23-1 and S pole 23-2.

Therefore, the armature coil L can not be energized. When the Hall device 25 faces to the S pole 23-2, the transistor 61 is conducted so that the condenser 63 is discharged via the diode 65 to cause the transistor 57 initially to become non-conductive. Hence the starting is completed. Also during the running the above-mentioned phenomenon may occur so that when the Hall device 25 passes the boundary between the N pole 23-1 and S pole 23-2 the armature coil can be temporarily energized to produce a counter torque. However, this phenomenon is eliminated since the gate input for the SCR 51 can be suppressed by means of the charges of the condenser 63 to prevent the mixing such a temporary counter torque.

In the embodiment of FIG. 8, while the gate control is operated by dividing to three stages the outputs of both sides of the Hall device, the same purpose can be achieved by employing an output of only one side of the Hall device i.e. of either N pole or S pole to obtain the output of three stages by means of a discrimination circuit threby to operate the gate control of SCRs 51, 52 and 53. In this case, it is preferable that the position sensing output of one stage may employ a non-signal (pole lacking portion).

Further, by two or three sets of the control circuit shown in FIG. 6 or 8, it is able to operate the energization control of two or three sets of three-phase armature coils. Such means may be effective in case of an electric motor for high power (no less than 200 W).

Figure 9:
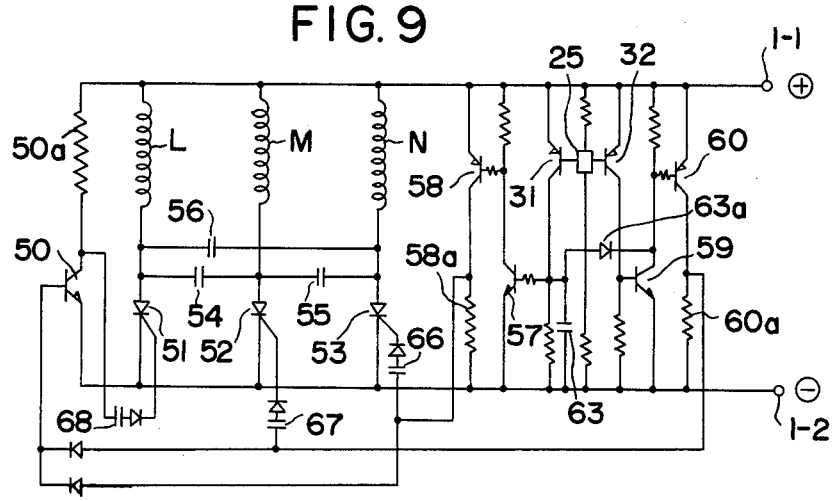

Next, an embodiment shown in FIG. 9 is a case which has lacked the So pole portion from the magnetic pole group N, S and So as shown in FIG. 4 which has to control the output of the Hall device 25. Therefore, the Hall output is obtained via N poles 23-1 and 23-4, S poles 23-2 and 23-5 and clear or gap portions 23-3 and 23-6 so that an energization control may be operated through SCRs 51, 52 and 53.

Armature coils L, M and N are each connected between positive terminal 1-1 and negative terminal 1-2 of the power source through SCRs 51, 52 and 53 respectively.

There is provided a Hall device 25 having, as well known, two couples of terminals. One couple of terminals of the Hall device 25 are connected to said power source terminals 1-1 and 1-2 via each resistor respectively. The other couple of terminals of the Hall device 25 are connected to bases of the transistors 31 and 32 emitters of which are each connected to the positive terminal 1-1. The collector of the transistor 31 is connected to the terminal 1-2 via parallel resistor and condenser 63, while the collector of the transistor 32 is jointed to the terminal 1-2 via a resistor.

There is provided a transistor 57 having a base connected to said collector of the transistor 31, a collector connected to the terminal 1-1 via a resistor, and an emitter connected to the terminal 1-2.

There is also provided a transistor 58 having a base connected to the collector of the transistor 57, an emitter connected to the terminal 1-1 and a collector connected to the terminal 1-2 via a resistor 58a.

Further there is provided a transistor 59 with a base connected to the collector of the transistor 32, a collector connected to the terminal 1-1 via resistor and to the collector of the transistor 31 via a diode 63a and an emitter connected to the terminal 1-2.

Also there is provided a transistor 60 having a base connected to the collector of the transistor 59 via a resistor, an emitter to the terminal 1-1, and a collector to the terminal 1-2 via a resistor 60a. The SCRs 51 and 52, SCRs 52 and 53, and SCRs 51 and 53 are bridged by condensers 54, 55 and 56, respectively.

There is provided a transistor 50 having a collector connected to the terminal 1-1 via resistor 50a, an emitter to the terminal 1-2, and a base connected via each diode to the respective collectors of the transistors 58 and 60.

Control or gate electrodes of the SCRs 51, 52 and 53 are connected via series-connected diodes and condensers 68, 67 and 66 to the collectors of the transistors 50, 60 and 58, respectively.

In operation, if the Hall device 25 faces to the N-pole 23-1, the output is obtained from the left hand side thereof to conduct the transistors 31, 57 and 58 so that the differential pulse via the resistor 58a and condenser 66 is impressed to the gate of the SCR 53 to ignite the same to cause the armature coil N to be energized. Next, if the Hall device 25 faces to the S pole 23-2, the transistors 32, 59 and 60 are conducted, and the differential pulse via the resistor 60a and condenser 67 is impressed to the gate of the SCR 52 so as to ignite the same to cause the armature coil M to be energized.

If, upon a further rotation for 60° of the motor, the Hall device 25 faces to the gap portion 23-3, the Hall output disappears. Therefore, the inputs for the transistor 50 via the resistors 58a and 60a disappear thereby to cause the same to be non-conductive. Thus, the differential pulse via the resistor 50a and condenser 68 is impressed to the gate of the SCR 51 to ignite the same to cause the armature coil L to be energized. Since the SCRs 53, 52 and 51 are each connected through the change-flow condensers 55, 54 and 56, the SCR is progressively distinguished. Hence, per 60° rotation of the motor, the SCR is cyclically ignited in a fashion 53→ 52→ 51→ 53 . . . , and the armature coil is cyclically energized in a fashion N→ M→ L→ . . . to form a revolving semiconductor motor. The function and effect are entirely same with the case of FIG. 8.

When starting, if the Hall device 25 has incidentally faced to a boundary between the N pole 23-1 and S pole 23-2, the Hall output is zero so that the SCR 51 is ignited to cause the armature coil L to be energized.

This output torque is of a counter torque, resulting in reversing rotation. However since immediately the Hall device 25 faces to the N pole 23-1, the SCR 53 is ignited so that the motor changes to run in forward rotation. But, again, the counter torque is produced due to the boundary between N and S poles so that the starting becomes unstable.

For prevention of such inconvenience a condenser 63 is provided. In the above-mentioned case, when the motor changes to run in forward rotation in which the Hall device 25 faces to the N pole 23-1, the condenser 63 is charged to retain the conduction of the transistors 57 and 58. Therefore, the conduction of the transistor 50 is also retained so that the armature coil L is unenergized until the Hall device 25 finishes to pass the boundary between the N and S poles. Thus, this causes a feature that the counter torque can not be produced and thereby the starting is completely achieved. Also, this causes a feature that it is possible to suppress the counter torque which may be produced by the fact that the armature coil L is temporarily energized as the Hall device 25 passes the boundary between the N and S poles within a continuous running of the motor.

When the Hall device 25 passed the boundary between the N and S poles and then faces to the S pole, since the transistor 59 is conducted, the condenser 63 is discharged via the diode 63a so that its charge disappears.

Even if the conduction of the transistors 57 and 58 by means of the condenser 63 is held for a long period, since the SCR 53 is distinguished by the change-flow upon igniting of the SCR 52, it is not necessary especially to discharge the electric charge of the condenser 63 by means of the diode 63a. It is able to exclude the diode 63a by selecting the time constant so that the electric charge of the condenser 63 disappears until the Hall device 25 faces to the gap portion 23-3.

In case of a high power DC machine, a high electric current may flow at the time of starting due to the small resistance of armature coils.

Therefore, it is necessary to use semiconductor switching elements of a high current capacity connected in series with the armature coils.

This is very uneconomical. To this end, the following means is provided. That is, the above-mentioned inconvenience can be obviated by inserting chopper circuits of SCRs in series with the armature circuits to form constant-current circuits for causing the starting so as not to exceed the current capacity of semiconductor elements for switching.

Figure 13:
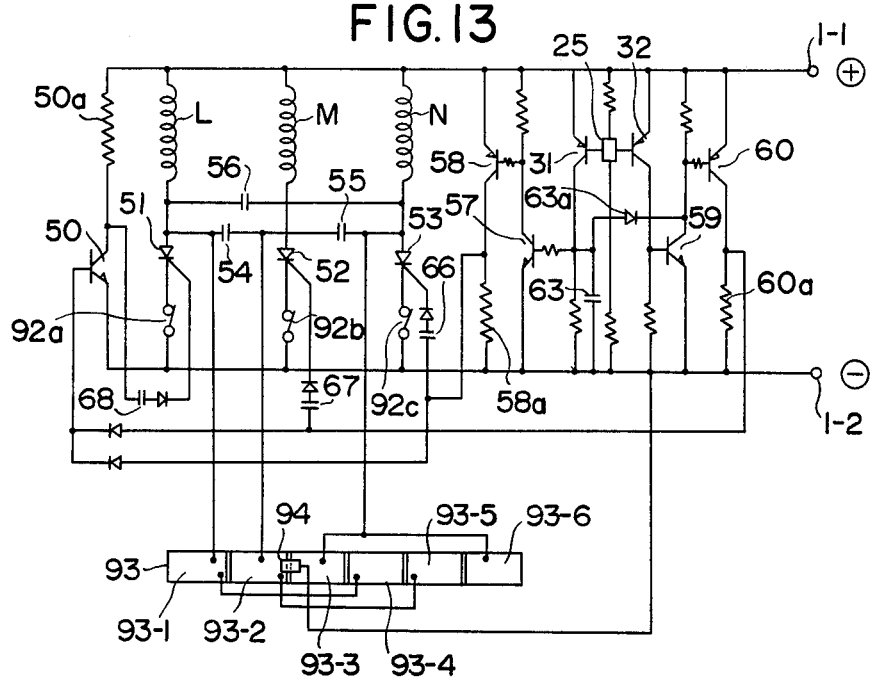
FIGS. 13 and 14 are circuit diagrams of other embodiments of the energization control circuit.

Alternatively, with employing an energization control circuit as shown in FIG. 13, the above-mentioned inconvenience can be obviated and, in addition, the burning of the motor due to the change-flow missing of an SCR can be also prevented.

In FIG. 13, a commutator 93 is fixed to the armature. The commutator 93 consists of commutator pieces 93-1, 93-2, . . . and a brush 94 is contacting thereagainst in sliding fashion. The brush 94 rotates (rightwards in the drawing 9 synchronously with field rotor (reference numeral 26 in FIG. 5) to become a field. Therefore, when starting, per each 60° revolution of the motor, the armature coils are cyclically energized in a fashion of N → M → L → . . . so that the motor can be started.

Since the combination of the commutator and brush withstand a considerable overload, it can also withstand a high current when starting.

At this time, electric switches 92a, 92b and 92c, each inserted between SCRs 51, 52 and 53 and negative line 1-2 respectively, are held open. There is provided a conventional means for rapidly separating the brush 94 from the commutator face, by an electromagnetic plunger which is driven by D. C. outputs in proportion to the centrifugal force or rotative speed, when the starting is completed to reach a predetermined velocity.

Since there is provided a means for automatically closing the electric switches 92a, 92b and 92c, in cooperation with the separating operation of the brush 94, such electric switches can be all closed.

Thereafter, the motor rotates as entirely same as the case of FIG. 9 to form a semiconductor motor.

If the change-flow missing of SCR occurs by accident, since the motor rapidly decreases in rotative speed, the brush 94 contacts in sliding fashion against the commutator 93 and simultaneously the electric switches 92a, 92b and 92c are opened. Therefore, again the motor is accelerated to return to a semiconductor motor, while SCRs all return to a normal operation.

However, the electric switches 92a, 92b and 92c are not indispensable, because each SCR is shorted by the brush 94.

Next, referring to FIG. 14, an embodiment in which the energization control circuit of FIG. 1 is modified will be explained.

A condenser 10a, inserted in the base circuit of the transistor 4, corresponds to the condenser 10 shown in FIG. 1, and has functional effects that cause a starting and prevent counter torque from a temporarily mixing within running, as entirely same as the case of FIG. 1.

However, a high capacitance unit must be used as the condenser 10a, in this case. Also, condensers 10b and 10c are inserted to the base circuits of the transistors 3 and 2 respectively.

Next, referring to a graph of FIG. 15, the operation of the condensers 10d, 10b and 10c will be described. In this graph, the same references with the graph of FIG. 10 show curves of identical property. That is, curves 70-1, 70-2 and 70-3 are counter electromotive force curves of armature coils A, B and C respectively. While this embodiment is applied to three phase coils of salient-pole type, the circumstance is same with respect to any kind of slot type or disk type (form of armature).

It is also same as in the case of FIG. 10 that the energization width is restricted within the dot lines 75 and 76 in order to obviate the shortcoming due to the energization curve shown in curve 71.

But, the beginning point of energization is advanced for a predetermined angle. To this end, the optical control band 15-1, 15-2, 15-3 of FIG. 2 is revolved for 30° in the arrow direction D and fixed to the rotor 16.

Thus, since the beginning point of energization is advanced, speaking with regard to for example the armature coil B as an instance, the energization curve may become one as in curve 72b, and the torque is produced substantially from a point of dot line 73.

However, due to the operation of the condenser 10b, the armature current is gradually increased. Though at a point of the dotted line 76b, the base input for the transistor 3 is cut off, the energization is, due to the charge voltage of the condenser 10b, continued with its drop to become a form as in curve 72b. The energization becomes as in curve 72a with respect to the armature coil A, and curve 72c with respect to the armature coil C.

Of course, these are caused by the influence of the condensers 10a and 10c.

If it is assumed that each energization curve corresponds to substantially the torque curve, the following effects are caused.

First, because the beginning and stopping of the energization are gradually operated, it is able to prevent productions of electrical noise as well as mechanical sound from the armatures due to the rapid torque variation.

Therefore this causes a good S/N ratio and is very effective in case of use as a motor of direct-drive type for a turntable.

Also, since each torque curve will overlap with another at both ends, the resultant torque curve is flattened.

As the position sensing element, a Hall device can be used in place of the photo transistor.

Figure 19:
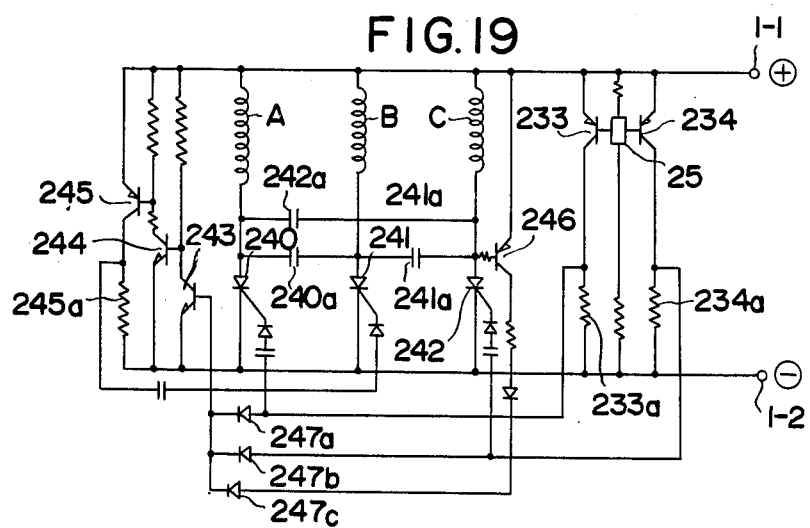

Next, FIG. 19 shows another embodiment of the energization control circuit in case of using a Hall device as the position sensing element and using SCRs as the elements for controlling the energization of armature coils.

As the electromagnetic control band, one shown in reference numeral 209 in FIG. 5 is used.

Armature coils A, B and C are each connected between positive terminal 1-1 of the power source and negative terminal 1-2 thereof through SCRs 240, 241 and 242 respectively.

Reference numeral 25 shows a Hall device, as well known, having two couples of terminals. One couple of terminals of the Hall device 25 are connected to said power source positive and negative terminals 1-1 and 1-2 via each resistor respectively. The other couple of terminals of the Hall device 25 are connected to bases of transistors 233 and 234 respectively, emitters of which are each connected to the positive terminal 1-1. The collectors of the transistors 233 and 234 are connected to the terminal 1-2 via resistors 233a and 234a respectively.

There is provided a transistor 243 having a collector connected to the terminal 1-1 via a resistor and an emitter connected to the terminal 1-2. There is also provided a transsistor 244 having a base connected to said collector of the transistor 243, an emitter connected to the terminal 1-2 and a collector connected to the terminal 1-1 via series two resistors. Further, there is provided a transistor 245 having a base connected to the collector of the transistor 244, an emitter connected to the terminal 1-1 and a collector connected to the terminal 1-2 via a resistor 245a. A further transistor 246 is provided with its base connected to the SCR 242 and emitter jointed to the terminal 1-1.

The SCRs 240 and 241, SCRs 241 and 242, and SCRs 242 and 240 are connected by condensers 240a, 241a and 242a respectively. The collector of the transistor 233 is connected to the base of the transistor 243 via a diode 247a and to the gate or control electrode of the SCR 240 via series condenser and diode.

The collector of the transistor 234 is connected to the base of the transistor 243 via a diode 247b and to the gate electrode of the SCR 242 via series condenser and diode. The collector of the transistor 246 is connected through series diode and condenser via a diode 247c to the base of the transistor 243. The collector of the transistor 245 is connected to the gate electrode of the SCR 241 via a condenser.

In operation, when the Hall device 25 is faces the N pole 209-1 (FIG. 5), the transistor 233 is conducted so that the gate pulse is supplied to the SCR 240 through the voltage drop of the resistor 233a to ignite the same. Therefore the armature coil A is energized. Next, upon 60° rotation of the motor with the Hall device 25 facing the non-signal portion 209-2, the base input through diodes 247a and 247b for the transistor 243 disappears thereby to cause the same to become nonconductive. Thus, since the transistors 244 and 245 are conducted, via the resistor 245a the gate pulse for SCR 241 is obtained thereby to ignite the same. Thus as soon as the armature coil B is energized, the armature coil A is unenergized through the change-flow condenser 240a. Upon further 60° rotation of the motor when the Hall device 25 is faced to the S pole 209-3, the transistor 234 is conducted so that the gate pulse via the resistor 234a for SCR 242 is obtained to thereby cause the armature coil C to be energized and simultaneously to cause the armature coil B to be unenergized through the change-flow condenser 241a.

In turn, upon further 60° rotation of the motor the Hall device 25 faces the N pole 209-4, so that the SCR 240 is conducted. Thus, armature coil A is energized, while the armature coil C is unenergized through the change-flow condenser 242a.

Hence, the armature coils are cyclically energized in a fashion A→B→C→ . . . per each 60° rotation of the motor to form a semiconductor motor revolving in same principle as in the preceding embodiments and thereby to provide functional effects as shown in FIG. 10.

When starting, if the Hall device 25 has incidentally faced to a boundary between the N pole 209-1 and the S pole 209-6, the Hall output becomes zero, resulting in igniting the SCR 241 to cause the armature coil B to be energized.

Thus, it produces a counter torque to cause the motor to run in reversing rotation. However, since the Hall device 25 immediately faces to the N pole 209-6, the SCR 242 is ignited so that the armature coil C is energized to cause the motor to run in forward rotation. Therefore, next, the Hall device 25 is again faced to the boundary between the N pole 209-1 and the S pole 209-6.

At this boundary point, since the Hall output is naturally zero, the armature coil B is energized to be again changed to the reversing torque to cause a difficulty in the starting.

But, since the transistor 246 is conducted upon the ignition of the SCR 242, the base voltage for the transistor 243 increases through the diode 247c to thereby conduct the transistor 243.

Therefore, since the transistor 245 is held nonconductive, the SCR 241 can not be ignited and also the armature coil B can not be energized.

Thus, the energization of the armature coil C due to the ignition of the SCR 242 is maintained as it is, and, when the Hall device 25 faces to the N pole 209-1, the armature coil A is energized so that the further continued rotation can be carried out.

Hence, this causes a feature that the starting can be completely achieved. As understood from the above-mentioned description, the function of the Hall device 25 due to the S pole is stored by means of the igniting action of the SCR 242, and through this stored memory, by the conduction of the transistor 246, it is suppressed that the armature coil B is energized. Also, the erasing of this memory has been performed by the change-flow condenser 242a.

FIGS. 20-24 show another embodiment using an inductive element as the position sensing device.

Figure 20:
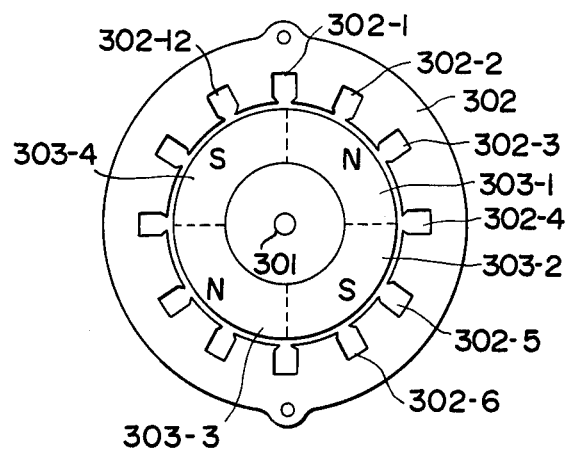
FIG. 20 is an explanatory view of a motor controlled for energization by a position sensing device using inductive elements.
Figure 21:
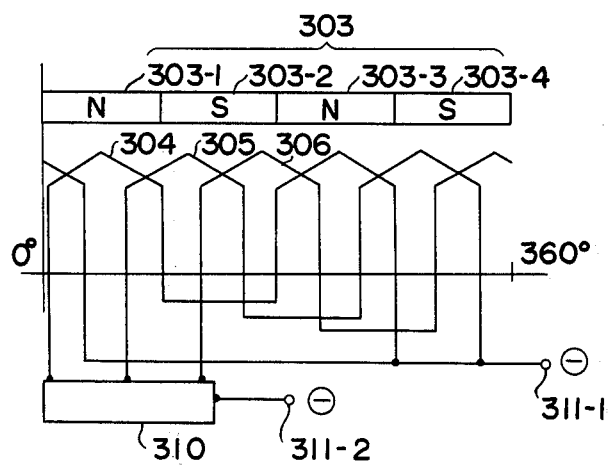
FIG. 21 is an expansion view of a magnet rotor and armature coils to be used in the motor of FIG. 20.

Referring first to FIG. 20, on an armature core there are provided slots 302-1, 302-2, . . ., in which three-phase armature coils are mounted to form an armature 302. On a rotating shaft 301, there is provided a magnet rotor comprising N pole 303-1, S pole 303-2, . . . FIG. 21 shows its expansion plan view. This is, the N pole 303-1, S pole 303-2, . . . form the magnet rotor 303, and the armature coil 304 is inserted into the slots 302-1, 302-4, 302-7 and 302-10 in a zigzag fashion.

The armature coil 306 is also inserted into the slots 302-2, 302-5, 302-8 and 302-11 in the same manner, and the armature coil 305 into the slots 302-3, 302-6, 302-9 and 302-12 in the same manner.

One terminal of the armature coils 304, 305 and 306 is connected in common to a power supply positive terminal 311-1 and the other terminal of the armature coils to the power supply negative terminal 311-2 via an energization control circuit 310.

Although the motor shown in FIG. 20 is one of an inner-rotating type, this invention is applicable also to both a motor of an outer-rotating type and that of an axial-gap type. Also, this invention is applicable to any of an armature-rotating type and a field-rotating type, such as an inside-out motor.

Next, referring to FIG. 22, a position sensing (write, read) device will be described hereinafter in detail.

In FIG. 22(a), a rotor 313 is fixed on the rotating shaft 301 shown in FIG. 20. On a circumferential portion of the rotor 313, there are arranged conductor portion 314 (copper made), clear or gap portion 315 and magnetic material portion 316 (soft ferrite made) as well as the conductor portion 314a, clear portion 315a and magnetic material portion 316a, each angularly spaced for 60° (i.e. angular space of ⅔ (60°) of 90° that is angular space of field poles 303-1, 303-2 . . . ).

Thus, on the above-mentioned circumferential portion there is arranged a magnetic anisotropic portion (writing) per each 60°. Magnetic-path open ends of a electromagnetic coil 317 are, in an opposed relation, provided to such magnetic anisotropic portions. The detail of the electromagnetic coil 317 is shown in FIG. 22(b). Namely, electromagnetic coils 317a and 317b are wound on a magnetic core 318. There is also provided a further similar electromagnetic coil, the detail of which is shown in FIG. 22(c). Namely, electromagnetic coils 320a and 320b are wound on a magnetic core 319, (reading means).

Referring now to FIG. 23, a position sensing signal obtained by and from the device of FIG. 22 will be described hereinafter. In FIG. 23(a) reference numeral 321 represents an oscillator comprising transistors for generating a frequency of about 100kc. An alternating current induced on the series-connected electromagnetic coils 317a and 317b, coupled with an input terminal of a bridge-type rectifier 322, is modified to direct current thereby to generate a voltage drop across a resistor 324 which is coupled with output terminal of the bridge-type rectifier 322. Similarly, an alternating current induced on the series-connected electromagnetic coils 320a and 320b, coupled with an input terminal of a bridge-type rectifier 323, is modified into direct current thereby, to produce a voltage drop across a resistor 325 which is coupled with output terminal of the bridge-type rectifier 323.

If the voltage drop across the resistor 324 is greater than the voltage drop across the resistor 325, a transistor 326 an emitter of which is connected to the resistor 324 is conducted to produce a voltage drop across a resistor 330 connected to a collector of the transistor 326 whereby a positive voltage is obtained from the terminal 328 at one end of the resistor 330. On the contrary, if the voltage drop across the resistor 325 is greater than the voltage drop across the resistor 324, a transistor 327 an emitter of which is connected to the resistor 325 is conducted to produce a voltage drop across a resistor 331 connected to a collector of the transistor 327 whereby a positive voltage is obtained from a terminal 329 at one end of the resistor 331.

The magnetic-path open ends of FIG. 22(c) is always maintained apart from the rotor 313. Only the magnetic-path open ends at FIG. 22(b) is faced to such magnetic anisotropic portions.

If the magnetic-path open ends of FIG. 22(b) are faced to the conductor portion 314 of FIG. 22(a), since its magnetic core 318 becomes smaller in inductance, the greater alternating current flows therethrough to increase the voltage drop across the resistor 324.

When the magnetic-path open ends are faced to the magnetic material portion 316, since its magnetic core 318 beocmes greater in conductance, the flowing alternating current becomes small to decrease the voltage drop across the resistor 324.

When the magnetic-path open ends of the core 318 are faced to the clear portion 315, the voltage drop across the resistor 324 becomes middle between the both as mentioned above.

In this case, by the alternating currents flowing through both electromagnetic coils 320a and 320b, the voltage drop produced across the resistor 325 becomes equal with that produced across the resistor 324. Therefore, since both transistors 326 and 327 become nonconductive, the output from the terminals 328 and 329 is zero.

As understood from the above explanation, if the rotor 313 in FIG. 22 rotates in a direction of the arrow B, when the core 318 faces to the conductor portion 314 the output is obtained from the terminal 328, and when the core 318 faces to the clear portion 315 the output from the terminals 328 and 329 is zero. And, when the magnetic material portion 316 faces to the core 318, the output is obtained from the terminal 329.

Thus, per each 60° rotation of the rotor 313, first the signal from the terminal 328 is obtained, next, upon 60° rotation, the output from the terminals 328 and 329 disappears and further upon 60° rotation the output is obtained from the terminal 329, to thereby form a position sensing device.

Such sensing signal may be obtained by other means, or in the following technical manner. That is by replacing both the conductor portions 314 and 314a as well as clear portions 315 and 315a by magnetic material portions, the gap space of portions 314 and 314a from the electromagnetic coil 317 is greater than that of portions 315 and 315a, and the gap space between the magnetic material portions 316 and 316a and the electromagnetic coil 317 is made smallest.

Referring now to FIG. 24, an energization control by such position sensing signals will be described hereinafter.

Armature coils 304, 305 and 306 are each connected between power source positive and negative terminals 311-1 and 311-2 through respective transistors 334, 335 and 336.

There is provided a transistor 337 having an emitter connected to the base of the transistor 334 and a collector connected to the terminal 311-1 via a resistor.

Further there is provided a transistor 338 having a collector connected to the base of the transistor 335 and to the terminal 311-1 via a resistor and an emitter connected to the terminal 311-2.

There is also provided a transistor 339 having an emitter connected to the base of the transistor 336 and a collector connected to the terminal 311-1 via a resistor.

The bases of the transistors 337 and 338 and the bases of the transistors 338 and 339 are joined by the diodes 342 and 343 respectively.

In operation, when the output from the terminal 328 of FIG. 23 is impressed to a terminal 340 connected to the base of the transistor 337, the transistor 334 is conducted via the transistor 337 to cause the armature coil 304 to be energized.

This occurs at a moment that the core 318 faces to the conductor portion 314 of the rotor 313. Since the input signal of the terminal 340 is supplied via the diode 342 to the base input of the transistor 338, the transistor 338 is conducted and thereby the transistor 335 is held nonconductive.

Upon 60° rotation of the motor (with the rotor 313), since the output of the terminals 328 and 329 disappears the input for the terminal is cut off to cause the armature coil 304 to be unenergized. Also, the base input for the transistor 338 disappears. Therefore transistor 335 is conducted to cause the armature coil 305 to be energized. Upon further 60° rotation, since the magnetic-path open ends of the core 318 face to the magnetic material portion 316, the output of the terminal 329 shown in FIG. 23 is impressed to a terminal 341 connected to the base of the transistor 339 shown in FIG. 24.

Thus, the transistor 339 is conducted and the transistor 336 is also held conductive to cause the armature coil 306 to be energized. Simultaneously, via the diode 343 the base input for the transistor 338 is obtained so that the transistor 333 is conducted and the transistor 335 is held nonconductive.

Per each 60° rotation of the motor the armature coils 304, 305 and 306 are progressively energized. Also in accordance with the magnetic core 318 progressively faced to the conductor portion 314a, clear portion 316a, shown in FIG. 22, similarly the armature coils 304, 305 and 306 are again progressively energized. By such arrangement of the position sensing device and the energization control circuit, the same energization curve is obtained as described with respect to the preceding embodiments and shown in FIG. 10.

In addition to the position sensing device shown in FIG. 23(a), another position sensing device as shown in FIG. 23(b) can be employed.

As the same reference numbers as in the FIG. 22(a) represents the same member, its detailed explanation is omitted.

An alternating current from the oscillator 321 is supplied to the series-connected electromagnetic coil 317a and 320a. Thus an induced output is produced in the separate electromagnetic coils 317b and 320b electromagnetically coupled with the coils 317a and 320a respectively. These induced outputs can be modified into direct current by the bridge-type rectifiers 322 and 323 input terminals of which are connected to said coils 317b and 320b respectively.

The other circuit constructions are identical with the one in FIG. 23(a).

When the core 318 faces to the conductor portion 314, the output of the electromagnetic coil 317b decreases due to the eddy-current loss, the transistor 327 is conducted and then the output from the terminal 329 is obtained. When the core 318 faces to the magnetic material portion 316, the magnetic path is closed, the output of the electromagnetic coil 317b increasing so that the transistor 326 is conducted and then an output from the terminal 328 is obtained.

In turn, when the core 318 faces to the clear portion 315, the output of the electromagnetic coil 317b equals to that of the electromagnetic coil 320b, and thus the transistors 326 and 327 become nonconductive so that the output is null. With connecting the terminals 328 and 329 to the terminals 341 and 340 as in FIG. 24 respectively, the energization control may be performed as entirely same as the preceding embodiments and the functional effects are also caused identically therewith.

In FIG. 23(a) the variation of a self-inductance has been employed and in FIG. 23(b) the variation of a mutual-inductance has been used.

Although the preceding embodiments have been described with respect to three-phase armature coils, the technical spirit of the invention can be also applied to the latter-described two-phase armature coils.

TWO PHASE MOTOR

Figure 11:
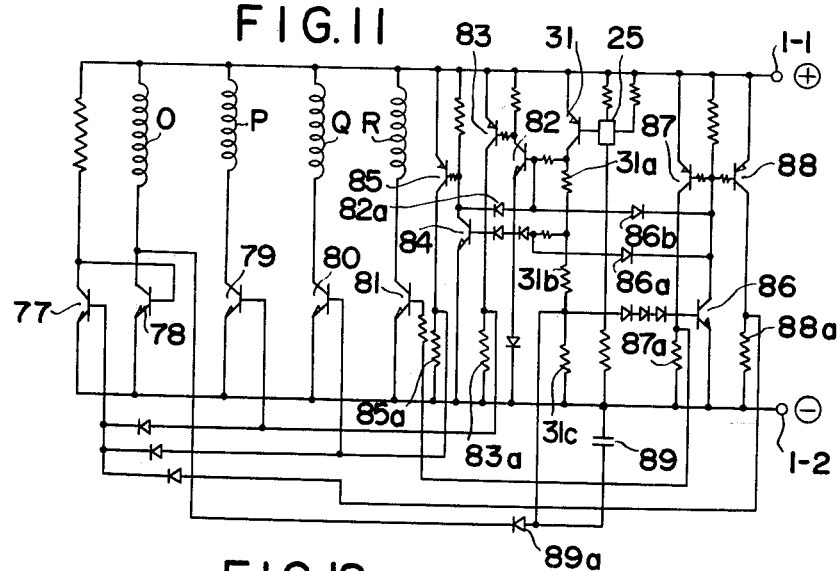
FIG. 11 is a circuit diagram of another embodiment of the energization control circuit.
Figure 12:
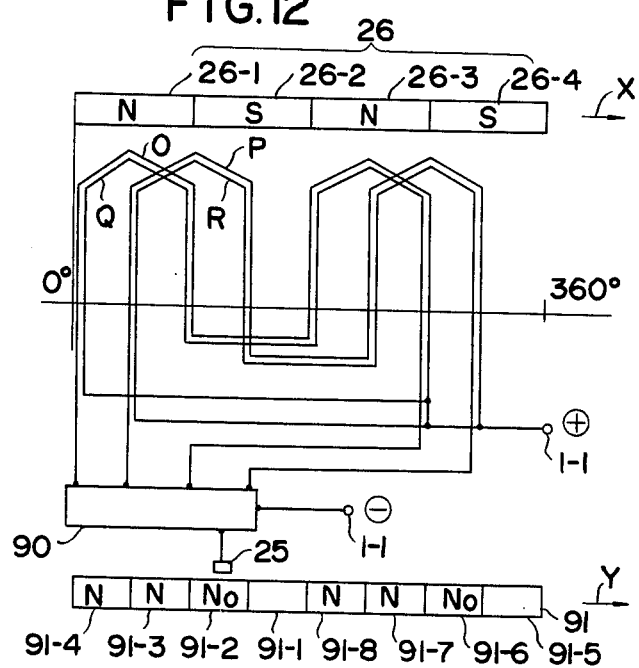
FIG. 12 is an expansion view of a field rotor and armature coils of a motor having two-phase armature coils.

Referring to FIGS. 11 and 12, the embodiment of two phase armature coils will be described hereinafter.

As the motor such a motor as illustrated in FIG. 4 has been employed although it can be one of any type, as the position sensing device the Hall device 25 has been employed, and as the magnetic poles for controlling the output of the Hall device 25 one, similar to a rotor, provided with the magnetic poles 23-1, 23-2, . . . shown in FIG. 4 has been employed.

In an expansion view of FIG. 12, shown in reference numeral 91 is a schematic view of such magnetic pole group. Only the Hall output under the magnetic field of N poles is employed, so that the control poles are constituted only by N poles, with portions 91-1 and 91-5 being clear portions lacking magnetic pole. The magnetic strength of N poles 91-4 and 91-8 is larger than that of $N_1$ poles 91-3 and 91-7, and the magnetic strength of $N_0$ poles 91-2 and 91-6 is smaller than that the the $N_1$ poles.

The angular space of each section is ½ (45°) of the angular space (90°) of the magnetic poles 26-1, 26-2, . . . in the field magnetic pole 26.

Center taps between armature coils P and R and between armature coils O and Q are in common connected to a power supply positive terminal 1-1, and independent terminals of the coils are connected via an energization control circuit 90 to the power supply negative terminal 1-2. The armature coils P and R are to be energized in the reverse direction to each other to form armature coils for one phase and also the armature coils O and Q are to be similarly energized to form armature coils for another phase.

Next, referring to FIG. 11, the energization control circuit 90 will be described in detail hereinafter.

Armature coils O, P, Q and R are connectd between the power source terminals 1-1 and 1-2 via transistors 78, 79, 80 and 81 respectively. The base of the transistor 78 is connected to a base of a transistor 77 having an emitter connected to the terminal 1-2 and a collector to the terminal 1-1. There is provided a transistor 85 having an emitter connected to the terminal 1-1 and a collector connected to the terminal 1-2 via a resistor 85a. The base of the transistor 85 is joined to a collector of a transistor 84 with the collector connected to the terminal 1-1 via a resistor and with an emitter connected to terminal 1-2. Further, there is arranged a transistor 83 having an emitter connected to terminal 1-1 and a collector to terminal 1-2 by a resistor 83a. The base of the transistor 83 is joined to a collector of transistor 82 with the collector connected to terminal 1-1 by a resistor and with an emitter connected to the terminal 1-2 by a diode.

The base of the transistor 82 is joined to a collector of a transistor 31, the collector being connected to the terminal 1-2 through collector resistors 31a, 31b and 31c, and an emitter connected to the terminal 1-1. Said Hall device 25 has two couples of terminal as is well known. One couple of the terminals are connected to the power source terminals 1-1 and 1-2 through respective resistors. The other couple of the terminals are joined to the base of the transistor 31 and to the power source positive terminal 1-1 via a resistor respectively.

There is also provided a transistor 86 having an emitter connected to the terminal 1-2 and a collector to the terminal 1-1 via a resistor.

Bases of transistors 87 and 88 are joined to said collector of the transistor 86 via respective resistors, which transistors 87 and 88 have respective emitters connectd to the terminal 1-1 and collectors connected to the terminal 1-2 through respective resistors 87a and 88a. The collector of the transistor 88 is connected to the base of the transistor 77 via a diode. The collector of the transistor 87 is joined to the base of the transistor 81 via a resistor. A condenser 89 is inserted between the terminal 1-2 and a point between the resistors 31b and 31c. Said point is also joined to the collector of the transistor 78 via a diode 89a. The collector of the transistor 83 is joined to the base of the transistor 79 and to the base of the transistor 77 via a diode. Also, the collector of the transistor 85 is joined to the base of the transistor 80 and to the base of the transistor 77 via a diode. The base of the transistor 82 is connected to both the collector of the transistor 84 through a diode 82a and the collector of the transistor 86 through a diode 86b. A point between the resistors 31a and 31b is connected to the base of the transistor 84 through series-connected diodes and a resistor, through which such a point is also connected to the collector of the transistor 86 via a diode 86a. First-mentioned point between the resistors 31b and 31c is connected to the base of said transistor 86.

In operation, when the Hall device 25 faces to the clear portion 91-1, since its output is zero, the transistor 77 is held nonconductive and the transistor 78 conducted so that the armature coil O is energized to produce a driving torque.

Upon a rotation of the motor with the Hall device 25 being faced to the $N_o$ pole 91-2, since the transistors 82 and 83 are conducted, the transistor 79 is conducted via the resistor 83a to cause the armature coil P to be energized. Simultaneously a base input for the transistor 77 is obtained via the diode to cause the transistor 77 to be conducted so that the transistor 78 becomes nonconductive to effect the unenergization of the armature coil O.

Upon further 45° rotation of the motor with the Hall device 25 being faced to $N_1$ pole (91-3), the magnetic intensity is increased and the Hall output is also elevated to conduct the transistors 84 and 85. Therefore the transistor 80 is conducted through the resistor 85a to cause the armature coil Q to be energized. Simultaneously a base input for the transistor 77 is obtained via the diode to cause the armature coil O to be unenergized and simultaneously a base voltage for the transistor 82 is dropped via the diode 82a to hold the transistor 82 and 83 nonconductive.

Thus the armature coil P is also unenergized. Upon still further 45° rotation of the motor with the Hall device 25 being faced to the N pole (91-4), the Hall output is further increased to conduct the transistors 86, 87 and 88. Therefore via the resistor 87a the transistor 81 is conducted to cause the armature coil R to be energized. Simultaneously since via the resistor 88a the transistor 77 is conducted, the armature coil O is unenergized and simultaneously since, via the diodes 86a and 86b, a base voltage for the transistors 82 and 84 drops to hold the same nonconductive, the armature coils P and Q are also unenergized.

As understood from the above descriptions, the energization of the armature coils is progressively and cyclically effected in a fashion of O→P→Q→R→ . . . producing a continued driving torque in a direction of the arrow X in FIG. 12 to form a semiconductor motor. An energization curve thereof has been shown in FIG. 17. Curves 101, 102, 103 and 104 represent counter electromotive force curves of individual armature coils O, P, Q and R respectively.

According to the conventional arts, speaking with regard to for example the armature coil P as an instance, the energization curve becomes identical with the angular width of the field, i.e. within dot lines 107 and 108, as in a curve 105 having peak values at its both ends. This results from the fact that at these points the counter electromotive force is small. At these points, the output torque is small, to thereby remarkably deteriorate the efficiency.

A high peak value at the right end results from an inductance of the armature coils, and oblique-line portion thereof invades the next field resulting in a counter torque to thereby further deteriorate the efficiency.

On the contrary, according to this invention an energization width is restricted so that the peak value disappears as in a curve 106. Thus it enables to remarkably elevate the efficiency and to decrease the revolution irregularity due to the counter torque.

Figure 14:
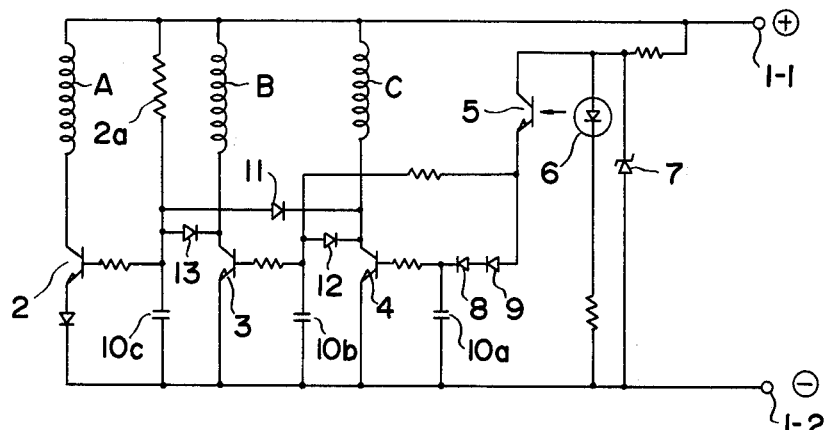

As illustrated in the embodiment of FIG. 14, with arranging condensers to the base sides of the transistors 78, 79, 80 and 81, the energization curves are extended to smooth the elevating portions and lowering portions and to superimpose them, so that the resultant torque can be flattened.

The width of the position sensing signal in case of two-phase armature coils and three-phase armature coils shall be defined by $2/n$ of the field magnetic pole angular width (wherein $n$ is 4 or 3).

Although the energization control has been effected by the Hall output, it can be also effected by a photoelectric output of a phototransistor. In this case, the transistor 31 is replaced by such a phototransistor and, as its optical-control band, a rotating filter an optical permeability of which decreases per each 45° must be employed.

Figure 15:
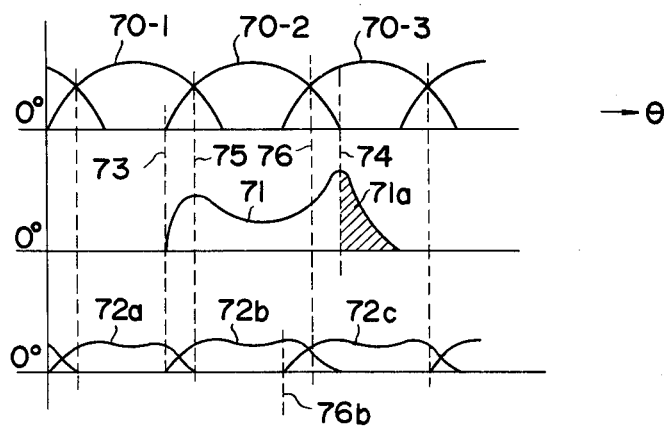
FIG. 15 is a graph of an energization curve.
Figure 17:
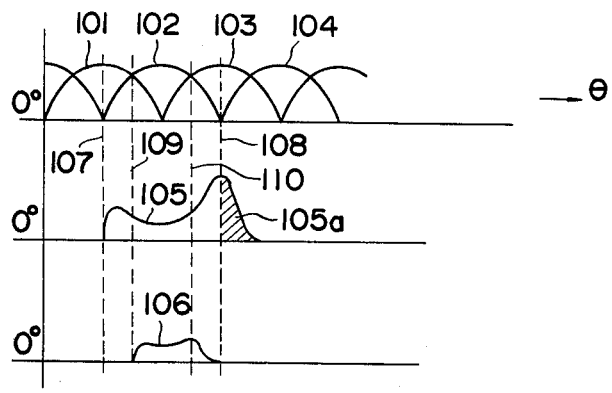
FIG. 17 is a graph of an energization curve in case of two-phase armature coils.

In graphs of FIGS. 10, 15 and 17, the obliqueline portions result in a counter torque. This is produced by an energization through an individual varistor which is usually connected in parallel with each armature coil in the energization control circuit.

In the embodiment of FIG. 11, when starting if the Hall device 25 is incidentally located between the clear gap portion 91-1 and the N pole 91-8, the same output as with the case in which the Hall device 25 is faced either to the $N_1$ pole or $N_o$ pole is obtained. For example, assuming that the same output as with the $N_1$ pole is obtained, the transistor 80 is conducted to cause the armature coil Q to be energized. This results in moving of the control band 91 of FIG. 12 in a direction opposite to arrow Y. Namely, this produces a counter torque to revolve in a reversing rotation, and immediately the Hall device 25 faces to the N pole resulting in a forward-rotation torque, and then it changes to the reversing-rotation torque, so that the starting does not take place easily to cause an inconvenience. Also when the same output as with the case in which the Hall device faces to the $N_o$ pole is obtained, it causes the same situation at a time of the starting.

The condenser 89 is provided for prevention of such difficulty.

When starting, upon the reversing rotation resulting in that the Hall device 25 is faced to the N pole, since the condenser 89 is charged to hold a conduction of the transistor 81; even if the Hall device 25 produces an output for giving a reversing torque it suppresses the output of the transistors 82 and 84 to prevent a production of such reversing torque an then the motor revolves until the Hall device 25 faces to the clear portion 91-1 to thereby complete the starting. Also at this time, since the transistor 78 is conducted, the charge of the condenser 89 is discharged via the diode 89a as a preparation for the next operation.

Also within the continued running, when the Hall device 25 moves from the N pole 91-8 to the clear portion 91-1, the same function may be accomplished to suppress the production of a temporary reversing torque.

Although all the above-mentioned embodiments are of a rotating-field type, this invention can be similarly applied to a semiconductor motor of a rotating-armature type.

In case of a position sensing device employing a photoelectric element e.g. a phototransistor and a luminescent diode, when these are used in a dusty place, the dust may be deposited onto an emission surface of the luminescent diode and a light-receiving surface of the phototransistor to thereby decrease a light-receiving quantity of the light so that the discrimination of position sensing signals may be difficult.

Figure 16:
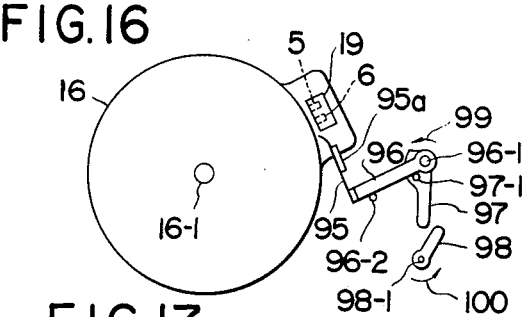
FIG. 16 is an explanatory view of a cleaner for faces of photoelectric elements.

For the prevention of such phenomenon, a mechanism shown in FIG. 16 is employed. This embodiment has been mounted on a mechanism shown in FIGS. 2(c) and (d). Therefore the same reference as with the FIGS. 2(c) and (d) represents the same member. In an inner portion of the housing 19 there are provided a liminescent diode 6 and a phototransistor 5, with both of its emission surface of the light and light-receiving surface being of a plane transparent face of plastics. Levers 96 and 97 are supported for independent pivotal motion on a bearing shaft 96-1 studded upright in the body, with the lever 96 being elastically biased toward a direction of an arrow 99.

Supported on a bearing shaft 98-1 is a lever 98 so constructed that it is operably coupled with for example an electric power supply switch of the motor so that the lever 98 will pivot for a predetermined angle toward a direction of an arrow 100 upon the switch-on and will return upon the switch-off. Also, in case of use as a capstan motor of a magnetic recording-reproducing machine employing a cassette or a cartridge, it is so constructed that the lever 98 will swing for a predetermined angle toward a direction of an arrow 100 in cooperation with a mounting operation of the cassette or cartridge and will return in cooperation with an ejection thereof.

Secured on a free end portion of the lever 96 is a leaf spring 95 to which a felt plate 95a is fixed. A stud pin 96-2 is intended for a stopper for the lever 96. The lever 97 is elastically biased by a weak spring (not shown) in a clockwise direction and held in a position as shown by abutting of an abutment pin 97-1 studded on the lever 97 against the lever 96. According to the above-mentioned construction, when switching-on or mounting the cassette or cartridge, the lever 98 swings to the direction of the arrow 100 and by a free end thereof through the lever 97 the lever 96 pivots in a clockwise direction. Thus the felt plate 95a may clean faces of the luminescent diode 6 and phototransistor 5 and return automatically. When the lever 98 returns by switching-off of the power supply switch or by ejecting the cassette or cartridge, only the lever 97 swings in counter-clockwise direction to enable the lever 98 to return.

Accordingly, the faces of the photoelectric elements are effectively kept clean.

It is to be observed that the position indicating arrangement used on the control band herein described has been termed "writing" and the function of the corresponding sensing element which deciphers this "writing" has been described as "reading". As is well understood in the art, the term "writing" includes magnetic, colored, audio or other impressions which an in turn be "read" by Hall crystals, magnetic head, sound receivers, photocells, etc., the reading means may or may not contact the writing and the writing may or may not be sensitive to the human senses.

It is, of course, understood that modifications may be made in the foregoing embodiments without departing from the scope of the invention as set forth in the appended claims.

It is claimed:

1. A semiconductor motor comprising:
   a. first, second and third phase armature coils mounted on a stator;
   b. a field arranged to face to said armature coils including a plurality of magnetic poles in which the other in an equal pitch;
   c. a disc member providing at a circumferential portion thereof with first, second and third three-step electromagnetic anisotropic portions;
   d. an electromagnetic coil arranged to face said disc member of sensing said electromagnetic anisotropic portions upon a rotation of the motor to cause the inductance of the coil to be varied;
   e. an oscillator source connected to said electromagnetic coil for feeding an alternating current to said electromagnetic coil;
   f. a discriminating circuit connected to said coil for obtaining first, second and third electric signals from said first, second and third electromagnetic anisotropic portions via a variation of the inductance of the electromagnetic coil; and,
   g. an energization control circuit connected to said discrimmination circuit for effecting an energization control via said first, second and third electric signals by conducting semiconductor switching elements seriesconnected to the respective first, second and third armature coils whereby a rotation control for the motor is achieved by position sensing signals due to an induction.

2. A semiconductor motor of claim 1 wherein the electromagnetic coil means is arranged to enable the use of self-inductance thereof.

3. A semiconductor motor of claim 1 wherein the electromagnetic coil means is arranged to enable the use of mutual-inductance thereof.

4. A semiconductor motor having a rotor and a stator comprising:
   a. three-phase armature coils mounted in stages on the stator and magnet poles on the rotor responsive to said coils;
   b. control band means having first, second and thrid written position portions thereon, the angular space of the position written portions corresponding substantially to ⅔ of the angular width of a field pole;
   c. a position sensing reading device on said stator arranged to face to said control band, in response to the relative rotation of said control band and sensing element, in synchronization with a rotation of the motor;
   d. an energization control circuit coupled to and controlled by said reading device for energizing progressively and cyclically each armature coil of the respective phases corresponding to each of said first, second and third position portions of the control band including gating semiconductor switching elements each series-connected to armature coils; and
   e. a memory circuit coupled to said semiconductor switching element for holding a conductive state of a semicondutor switching element which may be conducted by a position sensing signal produced by facing of the sensing reading element to the third control portion when the motor is used for forward rotation or to the first control portion when the motor is used for reversing rotation to thereby suppress a counter rotation due to a position sensing signal produced when said sensing reading element is located at a boundary between the first and third control band portions.

5. A semiconductor motor of claim 4 which further comprises:
   erase means for causing a memory of said memory circuit coupled to said semiconductor switching element to disappear when said sensing reading element faces to the first control portion when the motor is used for forward rotation or to the third control portion when the motor is used for reversing rotation.

6. A semiconductor motor of claim 5 wherein each semiconductor switching element comprises a switching transistor and said memory circuit comprises a condenser coupled to a base of the switching transistor which may be conducted by a position sensing signal produced by facing of the sensing reading element to the third control portion when the motor is used for forward rotation or to the first control portion when the motor is used for reversing rotation.

7. A semiconductor motor of claim 5 wherein each semiconductor switching element comprises a switching transistor and said memory circuit comprises a flip flop coupled to a base of the switching transistor which may be conducted by a position sensing signal produced by facing of the sensing reading element to the third control portion when the motor is used for forward rotation or to the first control portion when the motor is used for reversing rotation.

8. A semiconductor motor of claim 5 wherein each semiconductor switching element comprises a SCR, said memory circuit comprises the SCR which may be conducted by a position sensing signal produced by facing of the sensing reading element to the third control portion when the motor is used for forward rotation or to the first control portion when the motor is used for reversing rotation, and said erase means comprises a circuit in which the memory of the SCR forming the memory circuit is erased by a change-flow through an ignition of the SCR which is ingited by a position sensing signal produced by facing of the sensing reading element to the first control portion when the motor is used for forward rotation or to the third control portion when the motor is used for reversing rotation.

9. A semiconductor motor having a rotor and a stator comprising:

a. two-phase armature coil mounted in stages on the stator and magnet poles on the rotor responsive to said coil;
b. control band means having first, second, third and fourth written position portions thereon, the angular space of the position written portions corresponding substantially to ½ of the angular width of a field pole;
c. a position sensing reading device on said stator arranged to face to said control band, in response to the related rotation of said control band and sensing element, in synchronization with a rotation of the motor;
d. an energization control circuit coupled to and controlled by said reading device for energizing progressively and cyclically each armature coil of the respective phases corresponding to each of said first, second, third and fourth position portions of the control band including gating semiconductor switching elements each series-connected to armature coils; and
e. a memory circuit coupled to said semiconductor switching element for holding a conductive state of a semi-conductor switching element which may be conducted by a position sensing signal produced by facing of the sensing reading element to the fourth control portion when the motor is used for forward rotation or to the first control portion when the motor is used for reversing rotation to thereby suppress a counter rotation due to a position sensing signal produced when said sensing reading element is located at a boundary between the first and fourth control band portions.

10. A semiconductor motor of claim 9 which further comprises:
erase means for causing a memory of said memory circuit coupled to said semiconductor switching element to disappear when said sensing reading element faces to the first control portion when the motor is used for forward rotation or to the fourth control portion when the motor is used for reversing rotation.

11. A semiconductor motor of claim 10 wherein each semiconductor switching element comprises a switching transistor and said memory circuit comprises a condenser coupled to a base of the switching transistor which may be conducted by a position sensing signal produced by facing of the sensing reading element to the fourth control portion when the motor is used for forward rotation or to the first control portion when the motor is used for reversing rotation.

12. A semiconductor motor of claim 10 wherein each semiconductor switching element comprises a switching transistor and said memory circuit comprises a flip flop coupled to a base of the switching transistor which may be conducted by a position sensing signal produced by facing of the sensing reading element to the fourth control portion when the motor is used for forward rotation or to the first control portion when the motor is used for reversing rotation.

13. A semiconductor motor of claim 10 wherein each semiconductor switching element comprises a SCR, said memory circuit comprises the SCR which may be conducted by a position sensing signal produced by facing of the sensing reading element to the fourth control portion when the motor is used for forward rotation or to the first control portion when the motor is used for reversing rotation, and said erase means comprises a circuit in which the memory of the SCR forming the memory circuit is erased by a change-flow through an ignition of the SCR which is ignited by a position sensing signal produced by facing of the sensing reading element to the first control portion when the motor is used for forward rotation or to the fourth control portion when the motor is used for reversing rotation.

* * * * *